United States Patent
Lee et al.

(10) Patent No.: US 9,655,212 B2
(45) Date of Patent: May 16, 2017

(54) LIGHTING SYSTEM HAVING A PLURALITY OF LIGHTING DEVICES AND AN INTEGRATED CONTROL MODULE

(71) Applicant: LG ELECTRONICS INC., Seoul (KR)

(72) Inventors: Jaemyoung Lee, Seoul (KR); Inhwan Ra, Seoul (KR); Hyosuk Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/644,964

(22) Filed: Mar. 11, 2015

(65) Prior Publication Data

US 2015/0319827 A1    Nov. 5, 2015

(30) Foreign Application Priority Data

May 2, 2014    (KR) .................. 10-2014-0053489

(51) Int. Cl.
  *H05B 37/02*    (2006.01)
  *G06F 3/048*    (2013.01)
  *G06K 9/32*    (2006.01)

(52) U.S. Cl.
  CPC ......... *H05B 37/0272* (2013.01); *G06F 3/048* (2013.01); *G06K 9/3266* (2013.01); *H05B 37/0227* (2013.01); *H05B 37/0281* (2013.01)

(58) Field of Classification Search
  USPC ......... 315/149–159, 247, 185 S, 209 R, 224, 315/291, 307–326
  See application file for complete search history.

(56) References Cited

U.S. PATENT DOCUMENTS

| | | | |
|---|---|---|---|
| 8,502,480 B1 | 8/2013 | Gerszberg et al. | |
| 2012/0044421 A1* | 2/2012 | Lin | H04N 9/3179 348/584 |
| 2012/0075464 A1* | 3/2012 | Derenne | A61B 5/0013 348/135 |
| 2014/0333211 A1 | 11/2014 | Oka et al. | |
| 2015/0062323 A1* | 3/2015 | Gustafsson | G06F 3/013 348/78 |
| 2015/0123991 A1* | 5/2015 | Yarosh | G02B 27/017 345/629 |

FOREIGN PATENT DOCUMENTS

| | | |
|---|---|---|
| KR | 10-2014-0017735 | 2/2014 |
| WO | WO 2013/099629 A1 | 7/2013 |

OTHER PUBLICATIONS

Extended European Search Report for Application 15158282.2 dated Nov. 6, 2015.

* cited by examiner

*Primary Examiner* — Tuyet Vo
(74) *Attorney, Agent, or Firm* — KED & Associates LLP

(57) ABSTRACT

A lighting device includes: a communication unit that communicates with a wearable device with at least one camera and receives at least one image captured by the camera; a light emitting unit including one or more light emitting elements; and a controller that detects a readable medium containing a plurality of characters or visual content containing at least one color from the image and controls the light emitting unit based on the readable medium or the visual content.

8 Claims, 19 Drawing Sheets

(a)

(b)

LIGHTING SYSTEM HAVING A PLURALITY OF LIGHTING DEVICES AND AN INTEGRATED CONTROL MODULE

CROSS-REFERENCE TO RELATED APPLICATION

This application claims priority under 35 U.S.C. §119 to Korean Application No. 10-2014-0053489 filed on May 2, 2014, whose entire disclosure is hereby incorporated by reference.

BACKGROUND

1. Field

The present invention relates to a lighting system and a control method thereof which allow for lighting control based on images acquired by a wearable device.

2. Background

The lighting industry has continued to grow over the years. A lot of research on light sources, light emission methods, operation methods, efficiency improvement is under way in connection with the lighting industry.

Light sources currently used mainly for illumination include incandescent lamps, discharge lamps, and fluorescent lamps. Lighting using these light sources is used for various purposes such as home lighting, landscape lighting, industrial lighting, etc. Resistant light sources, such as the incandescent lamps, may have the problems of poor efficiency and heat generation. The discharge lamps may have the problems of high price and high voltage. The fluorescent lamps may have environmental problems caused by the use of mercury.

There is growing interest in light emitting diode (LED) lighting to solve the drawbacks of light sources. The LED lighting has advantages in efficiency, color variability, design flexibility, etc.

The light emitting diode is a semiconductor device that emits light when a voltage is applied thereto in a forward direction. The light emitting diode may have long lifetime, low power consumption, and electric, optical and physical characteristics suitable for mass production, to rapidly replace incandescent lamps and fluorescent lamps.

Smart technologies are getting attention recently which provide a domestic ubiquitous environment where computing can occur anytime, in any place, and on any device by employing home networking and internet information home appliances based on wired/wireless communications and digital information appliances.

By combining smart technologies with lighting, technical advancements have been made in lighting control with a terminal when the lighting and the terminal are connected for communication. However, the user has to enter a command on the terminal to control the lighting using the terminal.

BRIEF DESCRIPTION OF THE DRAWINGS

The embodiments will be described in detail with reference to the following drawings in which like reference numerals refer to like elements wherein.

DETAILED DESCRIPTION

Hereinafter the present invention will be described in detail with reference to the accompanying drawings.

In the following description, usage of suffixes such as 'module', 'unit' or 'unit' used for referring to elements is given merely to facilitate explanation of the present disclosure, without having any significant meaning by itself. Accordingly, both 'module' and 'unit' can be used in combination.

This specification will be described, focusing on, but not limited to, a glasses-type wearable device 100. The wearable device 100 refers to an electronic device that can be worn.

In this specification, a person in a room or a user refers to a person who is in a room equipped with a lighting device 200, wearing the wearable device 100. Both of the terminals can be used repeatedly or in combination.

Figure 1A:
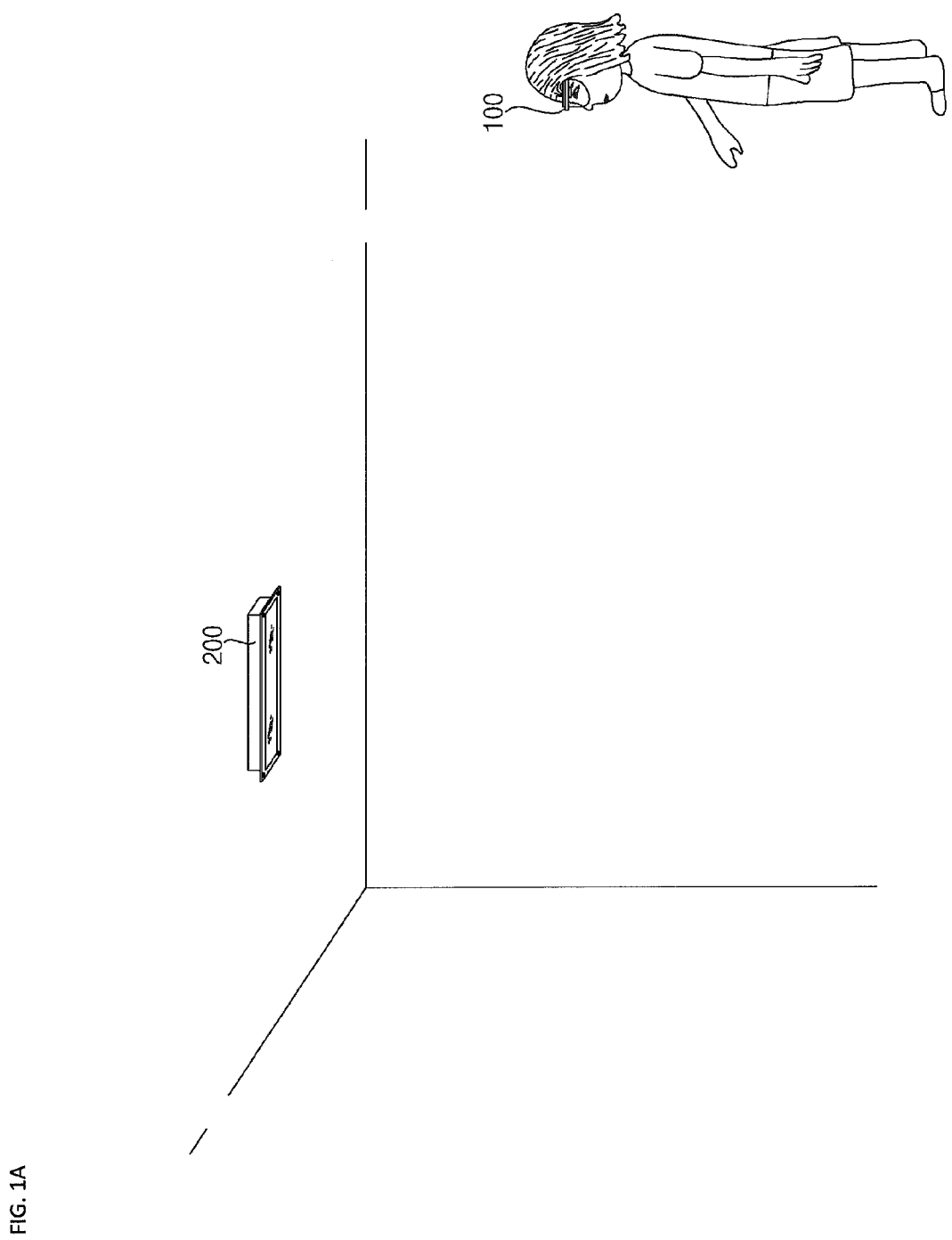
FIGS. 1a and 1b are views showing an environment where a lighting system according to an exemplary embodiment of the present invention is used.
Figure 1B:
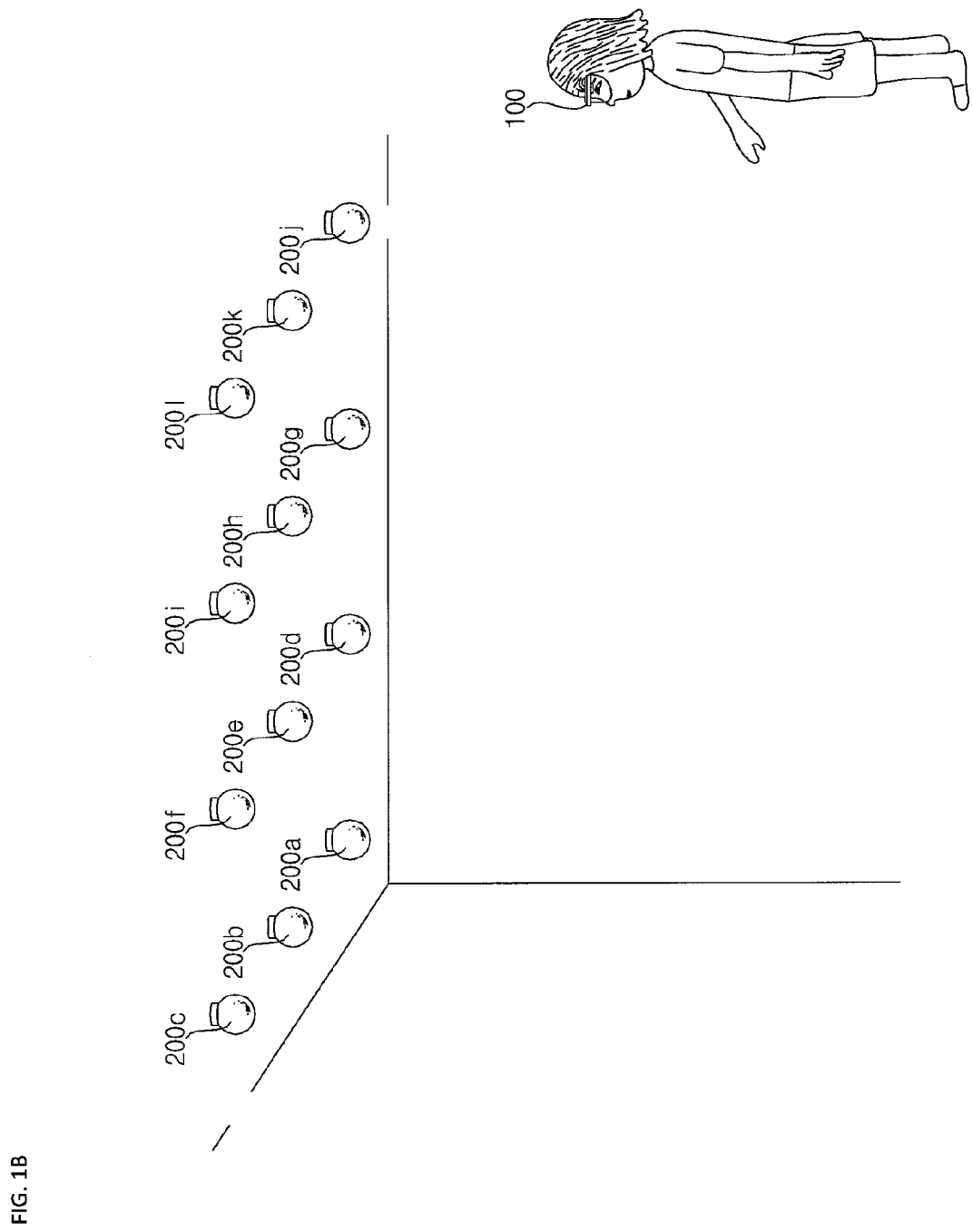

FIGS. 1a and 1b are views showing an environment where a lighting system according to an exemplary embodiment of the present invention is used.

Referring to FIG. 1a, a lighting system according to a first exemplary embodiment of the present invention includes a wearable device 100 and a lighting device 200.

The wearable device 100 has at least one camera. The wearable device 100 acquires at least one image using the camera. The wearable device 100 communicates with the lighting device 200. The wearable device 100 transmits the image to the lighting device 200.

The lighting device 200 communicates with the wearable device 100. The lighting device 200 receives at least one image from the wearable device 100. The lighting device 200 controls the level or color of illumination based on the received image.

Referring to FIG. 1b, a lighting system according to a second exemplary embodiment of the present invention includes a wearable device 100, an integrated control module, and a plurality of lighting devices 200 (200a to 200l). It should be made clear that FIG. 1b illustrates, but is not limited to, twelve lighting devices.

The wearable device 100 has at least one camera. The wearable device 100 acquires at least one image using the camera. The wearable device 100 communicates with the integrated control module. The wearable device 100 transmits the image to the integrated control module.

The integrated control module communicates with the wearable device 100. The integrated control module receives at least one image from the wearable device 100. The integrated control module controls the number of lighting devices 200 (200a to 200l) to be activated, based on the received image.

Figure 2:
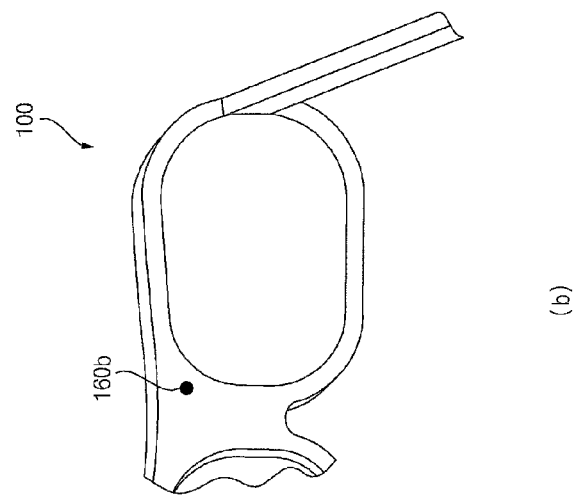
FIG. 2 is a view showing the wearable device according to the exemplary embodiment of the present invention.
Figure 2:
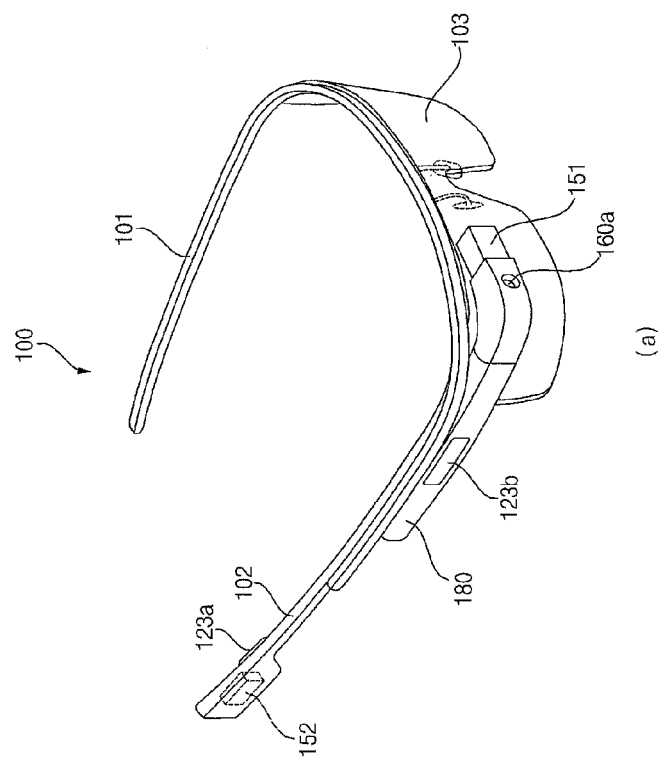

FIG. 2 is a view showing the wearable device according to the exemplary embodiment of the present invention.

Referring to FIG. 2, the glasses-type wearable device 100 is configured to be worn on a human head. To this end, a frame unit (a case, a housing, etc.) may be provided. The frame unit may be formed of a flexible material to make it easy to wear. This figure illustrates that the frame unit includes a first frame 101 and a second frame 102 that are made of different materials.

The frame unit is supported on the head, and has a space where various components are mounted. As shown therein, electronic components such as a wearable device controller 180 and a sound output module 152 may be mounted on the frame unit. A lens 103 that covers at least one of the left and right eye regions may be detachably mounted on the frame unit.

The wearable device controller 180 is adapted to control various electronic components in the wearable device 100. This figure illustrates that the wearable device controller 180 is installed on one side of the frame unit on the head. However, the position of the wearable device controller 180 is not limited to the illustrated position.

The wearable device 100 includes a display unit 151 that receives a control command from the wearable device controller 180 and outputs it to a predetermined screen.

The wearable device 100 includes at least one camera 160. FIG. 2 illustrates that the wearable device 100 includes a first camera 160a and a second camera 160b.

This figure illustrates that the first camera 160a is provided on the wearable device controller 180 and the second camera 160b is provided on the frame unit in proximity to one of the user's eyes; however, the present invention is not limited to this illustrated example.

The glasses-type wearable device 100 may have user input units 123a and 123b that are manipulated to receive a control command. The user input units 123a and 123b can employ any method so long as they can be manipulated in a tactile manner like touching, pushing, etc. This figure illustrates that the frame unit and the wearable device controller 180 include push-and-touch type user input units 123a and 123b, respectively.

Moreover, the glasses-type wearable device 100 may have a microphone (not shown) that receives sound and processing it into electric audio data and a sound output module 152 that outputs sound. The sound output module 152 may be adapted to transmit sound by a typical sound output method or by bone conduction. When implemented by bone conduction, the sound output module 152 of the wearable device 100 worn on the user is tightly attached to the head, and transmits sound by vibrating the skull.

Figure 3:
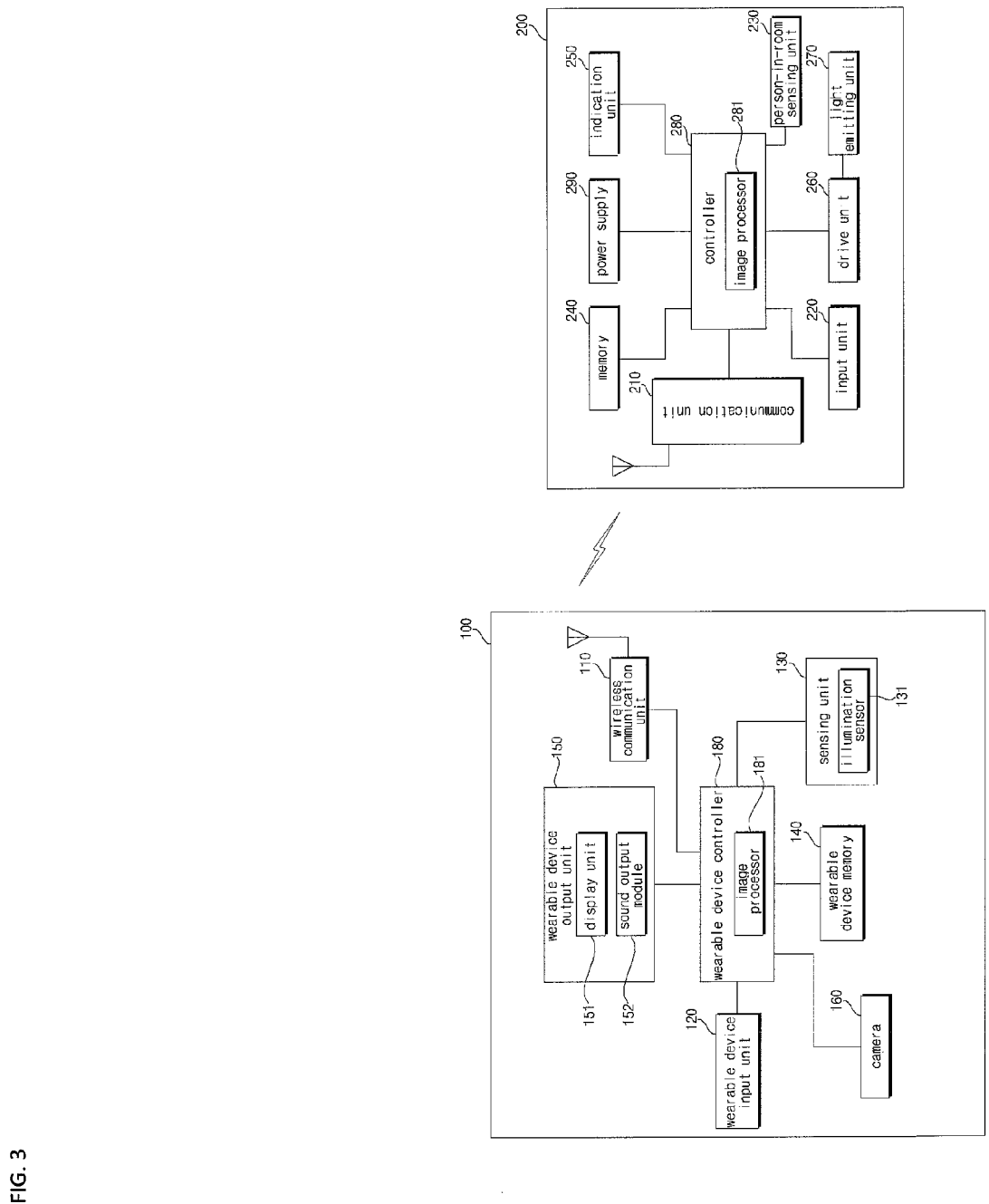
FIG. 3 is a block diagram showing the components of the lighting system according to the exemplary embodiment of the present invention.

FIG. 3 is a block diagram showing the components of the lighting system according to the exemplary embodiment of the present invention.

Referring to FIG. 3, the lighting system according to the first exemplary embodiment of the present invention may include a wearable device 100 and a lighting device 200.

The wearable device 100 may include a wireless communication unit 110, a wearable device input unit 120, a sensing unit 130, a wearable device memory 140, a wearable device output unit 150, and a wearable device controller 180.

The wireless communication unit 110 may include one or more modules that enable wireless communications between the wearable device 100 and the lighting device 200 or between the wearable device 100 and the integrated control module 300. Moreover, the wireless communication unit 110 may include one or more modules that connect the wearable device 100 to one or more communication networks.

The wireless communication unit 110 is able to communicate with the lighting device 200 over Bluetooth. Bluetooth allows for communication at low power and can be set up at low cost. Accordingly, Bluetooth is preferred for indoor short range communication between the wearable device 100 and the lighting device 200.

The wireless communication unit 110 may use communication protocols such as Wi-Fi Direct, RFID (Radio Frequency Identification), IrDA (Infrared Data Association), UWB (Ultra Wideband), ZigBee, and NFC (Near Field Communication), as well as Bluetooth.

The wireless communication unit 110 communicates with the lighting device 200, and transmits information sensed by the sensing unit 130 or an image captured by a camera 160 to the lighting device 200. Alternatively, the wireless communication unit 110 may transmit a control signal for controlling the lighting device 200 according to an exemplary embodiment.

The wearable device input unit 120 may include a camera 160 or image input unit for inputting an image signal, a microphone (not shown) or audio input unit for inputting an audio signal, and a user input unit (not shown, for example, a touch key or a mechanical key) for receiving information from the user. Audio data or image data collected by the wearable device input unit 120 may be analyzed and processed into a user's control command. For example, the wearable device controller 180 may control the wearable device 100 to receive the user's voice through the microphone and go into the first mode. The first mode may be a mode for controlling lighting based on at least one image acquired by the camera 160 while the wearable device 100 and the lighting device 200 are connected for communication. The image may be an image of the scene in front of the user.

The sensing unit 130 may include one or more sensors for sensing at least one of the following: information in the wearable device 100, information on the environment surrounding the wearable device 100, and user information.

For example, the sensing unit 130 may include at least one of the following: an illumination sensor 131, a motion sensor, an optical sensor (e.g., camera), a touch sensor, a proximity sensor, an acceleration sensor, a magnetic sensor, a G-sensor, a gyroscope sensor, an RGB sensor, an IR (infrared) sensor, a finger scan sensor, an ultrasonic sensor, a microphone, a battery gauge, an environment sensor (e.g., barometer, hygrometer, thermometer, radiation sensor, thermal sensor, or gas sensor), and a chemical sensor (e.g., electronic nose, health-care sensor, or biometric sensor). A mobile wearable device disclosed in this specification may use information sensed by at least two of these sensors in combination.

The illumination sensor 131 senses the level of illumination of surrounding light in a certain space. The illumination sensor 131 includes an element whose resistance changes depending on the intensity of the surrounding light. The illumination sensor 131 calculates variations of voltage or current caused by variations in the resistance of the element.

The wearable device memory 140 stores data that supports various functions of the wearable device 100. The wearable device memory 140 may store multiple application programs (or applications) that run on the wearable device 100 and data and commands for operating the wearable device 100. Moreover, the wearable device memory 140 may store image data acquired by the camera 160.

The wearable device output unit 150 is for producing output related to visual, auditory, and tactile senses. The wearable device output unit 150 may include at least one of a display unit 151, a sound output module 152, a haptic module (not shown), and a light output unit (not shown).

The display unit 151 may be implemented in the form of a head mounted display (HMD). Ahead-mounted display is a display device, worn on the head, that has a small display optic in front of the user's eyes. The display unit 151 may be located corresponding to at least one of the left and right eyes so that an image is provided in front of the user's eyes when the use is wearing the glasses-type wearable device 100.

The display unit 151 may project an image to the eyes through a prism. The prism may be translucent to enable the user to see the projected image together with the general view in front of the user (range of vision with the user's eyes).

As such, an image output through the display unit 151 can be seen overlapping the general view. Using this feature of the display unit, the wearable device 100 can provide augmented reality (AR) which shows a virtual image overlaid on an image of the real world or background.

The sound output module 153 outputs audio data which has been received from the wireless communication unit 110 in a call signal reception mode, a calling mode, a recording mode, a voice recognition mode, a broadcast reception mode, etc., or outputs audio data which has been stored in the memory 160. In addition, the sound output module 153 outputs an audio signal related to a function (e.g., a call signal reception sound, a message reception sound, etc.) performed by the mobile terminal 100. The sound output module 153 may include a speaker, a buzzer, and the like. The sound output module 153 may inform the user that it has gone into the first or second mode.

The camera 160 may include a first camera 160a and a second camera 160b.

The first camera 160a is located in proximity to at least one of the left and right eyes, and adapted to capture an image in front of it. Since the first camera 160a is positioned in proximity to an eye, the first camera 160a can acquire an image of the scene the user is looking at.

The second camera 160b is located in proximity to at least one of the left and right eyes, and adapted to capture an image of the user.

The camera 160 may acquire a plurality of images of a certain object for a predetermined period of time. The period of time and the number of acquired images are set values. For example, in the first mode, the camera 160 may acquire fifty images of an object for ten seconds. A plurality of images of the object may be transmitted to an image processor 181, 281, or 381 and processed.

The camera 160 may include image sensor. The image sensor may be a CCD or CMOS. The camera 160 may further include a image processor. That is, the acquired images may be processed by the image processor and output.

The wearable device 100 may further include an infrared light source (not shown) to acquire a high-resolution image. In this case, the camera 160 has an infrared transmitting filter mounted on it. The infrared light source emits infrared light to an object. The camera 160 may output images of the object representing only the frequency components of the emitted infrared light. By further including an infrared light source (not shown), the camera 160 may acquire high-resolution images of the object representing only the frequency components of infrared rays.

The wearable device controller 180 controls the overall operation of the wearable device 100. The wearable device controller 180 processes signals, data, information, etc. input or output through each of the components. he wearable device controller 180 may provide proper information or functions to the user or process them by running an application program stored in the wearable device memory 140.

Moreover, the wearable device controller 180 may control at least some of the components. Further, the wearable device controller 180 may operate at least two of the components contained in the wearable device 100 in combination, in order to run the application program.

The wearable device controller 180 may include an image processor 181. The image processor 181 will be described in detail with reference to FIG. 4.

The wearable device controller 180 may generate control signals based on data received from the image processor 181.

The wearable device controller 180 may be implemented using at least one of application specific integrated circuits (ASICs), digital signal processors (DSPs), digital signal processing devices (DSPDs), programmable logic devices (PLDs), field programmable gate arrays (FPGSs), processors, controllers, micro-controllers, microprocessors and electrical units for executing other functions.

The lighting device 200 may include a communication unit 210, an input unit 220, a person-in-room sensing unit 230, a memory 240, an indication unit 250, a drive unit 260, a light emitting unit 270, a controller 280, and a power supply 290.

The communication unit 210 sends and receives data by communicating with the wearable device 100. The communication unit 210 connects with the controller 280, and sends and receives data to and from the wearable device 100 in response to a control signal. The communication unit 210 transmits the data received from the wearable device 100 to the controller 280.

The wireless communication unit 210 is able to communicate with the wearable device 100 over Bluetooth.

The wireless communication unit 210 may use communication protocols such as Wi-Fi Direct, RFID (Radio Frequency Identification), IrDA (Infrared Data Association), UWB (Ultra Wideband), ZigBee, and NFC (Near Field Communication), as well as Bluetooth.

The communication unit 210 may include an RF (Radio Frequency) circuit. The communication unit 210 may send and receive RF signals, i.e., electromagnetic signals. The RF circuit may convert an electrical signal into an electromagnetic signal or vice versa, and communicate with the wearable device 100 using the electromagnetic signal.

For example, the RF circuit may include an antenna system, an RF transceiver, one or more amplifiers, a tuner, one or more oscillators, a digital signal processor, a CODEC chipset, memory, etc. The RF circuit may include well-known circuitry for performing communication functions.

The communication unit 210 may receive information sensed by the sensing unit 130 by communicating with the wearable device 100 having the sensing unit 130. For example, the communication unit 210 may receive from the wearable device 100 information on the level of illumination in the surrounding environment sensed by the illumination sensor 131.

The communication unit 210 may receive from the wearable device 100 image data acquired by the camera 160. For example, the communication unit 210 may receive at least one image acquired by the camera 160. The image may be an image of the scene in front of the user.

The input unit 220 may receive the brightness of the light emitting unit 270 which is selected by the user. The input unit 220 may be embedded in the lighting device 200. Alternatively, the input unit 220 may be configured separately from the lighting device 200. Also, the input unit 220 may be connected to a remote controller (not shown) either by wires or wirelessly and receive user input. The input unit 220 may include a keypad, a dome switch, a touchpad (static pressure/capacitance), a jog wheel, a jog switch, and the like.

For example, if the input unit 220 is a jog wheel, the user may adjust the brightness of the lighting device 200 by turning the jog wheel. According to the user's selection, the input unit 220 may generate a brightness selection signal and output it to the controller 280. In this case, the user may choose to switch on or off the lighting device 200 which is not powered up, and accordingly decide to apply power to the lighting device 200.

For example, when the user chooses to increase the level of illumination of the lighting device 200, the input unit 220 generates an illumination-up signal. On the other hand, when the user chooses to decrease the level of illumination of the lighting device 200, the input unit 220 generates an illumination-down signal. That is, the input unit 220 may directly receive user input.

The person-in-room sensing unit 230 senses the position of a person who is in a room equipped with the lighting device 200. In this case, the person in the room may wear the wearable device 100 equipped with the camera 160.

The person-in-room sensing unit 230 may be an IR sensor and/or an ultrasonic sensor. The IR sensor is a sensor that senses the position of a person in a room by detecting the movement of a heat source (the person in the room). The ultrasonic sensor is a sensor that senses the position of a person in a room based on an ultrasonic signal reflected and returning from an object (the person in the room). The person-in-room sensing unit 230 may be a combination of an IR sensor and an ultrasonic sensor.

In this specification, the person-in-room sensing unit 230 is included in, but not limited to, the lighting device 200. It should be made clear that the person-in-room 230 may be configured independently from the lighting device 200 according to an exemplary embodiment of the present invention.

The memory 240 may store data and commands for operating the lighting device 200.

The memory 240 may store data received from the wearable device 100. For example, the memory 240 may store at least one image received from the wearable device 100. Alternatively, the memory 240 may store data on a readable medium or visual content that is received from the wearable device 100. Alternatively, the memory 240 may store control signals received from the wearable device 100.

The memory 240 may store preset PIN (Personal Identification Number) information of the wearable device 100 which is used for communications security.

The memory 240 may include non-volatile memory, such as one or more magnetic disk storage devices, flash memory devices, or other non-volatile solid state memory devices. The present invention is not limited to these examples, and the memory 240 may include a readable storage medium.

For example, the memory 240 may include EEP-ROM (Electronically Erasable and Programmable Read Only Memory). Information can be written to or erased from EEP-ROM by the controller 280 during the operation of the controller 280. EEP-ROM may be a memory device that keeps the information stored in it without erasing it even when power is lost.

The indication unit 250 externally indicates whether a communication connection is made between the lighting device 200 and the wearable device 100 or not. The indication unit 250 externally indicates whether a communication connection is currently made between the lighting device 200 and the wearable device 100 or not, in order to prevent an attempt for connection to other additional wearable devices 100 from making the control of the lighting device 200 complicated and disturbing the user settings for lighting.

The indication unit 250 may externally indicate whether the lighting device 200 goes into the first mode or the second mode.

The indication unit 250 may externally indicate through a speaker or bulb that the lighting device 200 establishes a communication connection with the wearable device 100 or goes into the first mode while connected to the wearable device 100 for communication.

The drive unit 260 receives a control signal from the controller 280. The drive unit 260 applies driving current to the light emitting unit 270 in response to the control signal. The illumination, dimming, color temperature, color, and flickering of light emitted from the light emitting unit 270 are controlled according to the driving current applied from the drive unit 260.

The light emitting unit 270 includes a substrate and at least one light emitting element mounted on the substrate. The light emitting element emits light when powered, and its brightness may vary with the amount of power applied. Also, the color temperature of the light emitting element may vary with power, and the color of emitted light may vary from combinations of red (R), green (G), and blue (B). The light emitting unit 270 may include a plurality of LED elements. Specifically, the light emitting unit 270 includes white, red, green, and blue LED elements by reaction with fluorescent materials. The light emitting unit 270 is driven by receiving driving current from the drive unit 260.

The controller 280 receives data from the communication unit 210. The controller 280 controls the light emitting unit 270 based on the received data. That is, the controller 280 transmits a control signal to the drive unit 260 based on lighting control data to control the light emitting unit 270 and adjust lighting properties.

The controller 280 may include an image processor 281. The image processor 281 will be described in detail with reference to FIG. 4.

The controller 280 may generate control signals based on data received from the image processor 281.

The controller 280 may generate control signals based on data stored in the memory 240.

The controller 280 may be implemented using at least one of application specific integrated circuits (ASICs), digital signal processors (DSPs), digital signal processing devices (DSPDs), programmable logic devices (PLDs), field programmable gate arrays (FPGSs), processors, controllers, micro-controllers, microprocessors and electrical units for executing other functions.

The power supply unit 290 is connected to a power supply source and supplies electric power to the lighting device. The power supply unit 290 may include a converter that converts between AC and DC depending on the type of power used. The power supply unit 290 may further include a power conservation circuit or a voltage step-down regulator for supplying a certain level of static current.

If a plurality of wearable devices 100 are positioned in proximity to the lighting device 200, this may cause a problem with the communication connection between the lighting device 200 and the wearable devices 100. Also, when the lighting device 200 and the wearable device 100 are connected for communication, there may be a problem with an attempt to connect to other additional wearable devices 100.

In this case, the controller 280 may control the communication unit 210 to form a communication channel with the first wearable device 100a with the highest priority according to the order of connection requests made. That is, the communication unit 210 forms a communication channel with the first wearable device 100a which has made the earliest connection attempt, among the plurality of wearable devices 100 that have sent and received a connection signal to and from the lighting device 200. The communication channel is formed without entering a pin code, which simplifies the formation of a communication channel by the lighting device, requires less time, and offers convenience for use.

When a communication channel with the first wearable device 100a is established, the controller 280 may control the communication unit 210 not to respond to a connection signal from other wearable devices 100b. Accordingly, this prevents a connection between the lighting device 200 and the plurality of wearable devices 100a and 100b from making the control of the light emitting unit 270 complicated and prevents other people from changing the user settings.

In the present invention, the communication unit 210 also may form a plurality of communication channels with other wearable devices 100b simultaneously in response to a connection signal after forming a communication channel with the first wearable device 100a.

When the communication unit 210 receives a connection signal from a plurality of wearable devices, the controller 280 may receive pin codes from the plurality of wearable devices 100, compares them with the PIN (Personal Identification Number) codes stored in the memory 240, and control the communication unit 210 to form a communication channel with the first wearable device 100a which is given the highest priority, among the wearable devices 100 having a matching PIN code. In this case, the PIN codes of the communication unit 210 and the priorities of connection of the wearable devices 100 may be stored in the memory 240.

Specifically, the controller 280 controls the communication unit 210 to transmit a PIN code request signal to the plurality of wearable devices 100 that have sent a connection signal. Afterwards, the controller 280 compares the pin codes transmitted from the plurality of the wearable devices 100 with the PIN codes stored in the memory 240 and determines the priorities of the wearable devices 100 having a matching PIN code.

Accordingly, the lighting device 200 forms a communication channel with the first wearable device 100a with the highest priority. The communication unit 210 does not respond to any wearable device having no matching PIN code.

This type of communication channel formation requires a PIN code when forming a communication channel, and therefore has the advantage of preventing the light emitting unit from being controlled by other wearable devices connected without permission.

Figure 4:
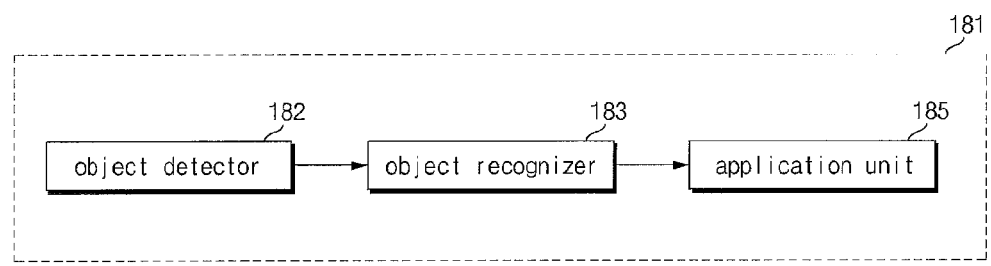
FIG. 4 is a block diagram showing the components of an image processor according to the exemplary embodiment of the present invention.
Figure 4:
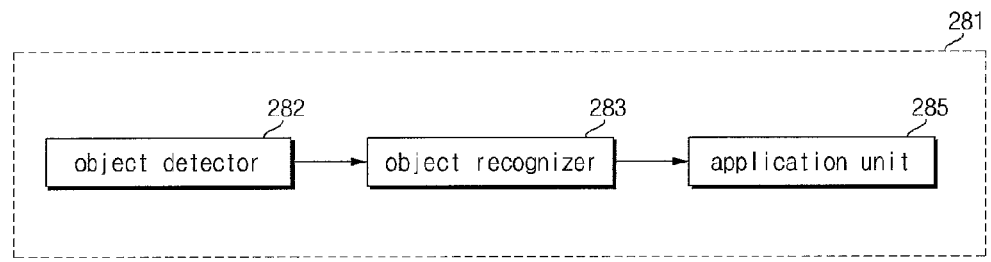

FIG. 4 is a block diagram showing the components of an image processor according to the exemplary embodiment of the present invention.

(a) of FIG. 4 illustrates that the image processor 181 is included in the wearable device controller 180. (b) of FIG. 4 illustrates that the image processor 281 is included in the controller 280 of the lighting device 200.

The image processor 181 included in the wearable device 100 processes images based on at least one image acquired from the camera 160. The image may be an image of the scene in front of the user.

The image processor 281 included in the lighting device 200 processes images based on at least one image received from the communication unit 210. The image may be an image of the scene in front of the user.

The image processor 181 or 281 includes an object detector 182 or 282, an object recognizer 183 or 283, and an application unit 185 or 285.

The object detector 182 or 282 detects an object from an image acquired by the camera 160. For example, the object detector 182 or 282 detects a readable medium or visual content. The readable medium may refer to a medium that contains multiple characters that a person in a room can read. Examples of the readable medium may include a book, newspaper, a magazine, a notebook, an electronic document displayed on a terminal, etc. Examples of the visual content may include a photograph, a video, etc. The visual content may be displayed on a predetermined terminal. The terminal includes a mobile phone, a smartphone, a desktop computer, a notebook computer, a digital broadcast terminal, a PDA (Personal Digital Assistant), a PMP (Portable Multimedia Player), a navigation system, a tablet computer, an e-book reader, and the like.

The object detector 182 or 282 may detect a readable medium or visual content by using at least one of the following properties: intensity, color, histogram, feature point, shape, space position, and motion.

The object recognizer 183 or 283 classifies and recognizes a detected object. To this end, the object recognizer 183 or 283 may use a recognition technique using a neural network, an SVM (Support Vector Machine) technique, a recognition technique using AdaBoost with Haar-like features, or a HOG (Histograms of Oriented Gradients) technique.

The object recognizer 183 or 283 compares the objects stored in the memory 140 or 240 with a detected object to recognize it. For example, the object recognizer 183 or 283 may classify and recognize a readable medium or visual content.

The application unit 185 or 285 may calculate the level or color of illumination based on the recognized object.

For example, if the recognized object is a readable medium, the application unit 185 or 285 may calculate the right level or color of illumination for the size of the characters written on the readable medium.

For example, if the recognized object is a readable medium, the application unit 185 or 285 may calculate the right level or color of illumination for the number of the characters contained in the readable medium. In this case, if the number of the characters contained in the readable medium is greater than or equal to a first reference value, the application unit 185 or 285 may increase the level of illumination the current lighting device 200 is giving. Also, if the number of the characters contained in the readable medium is less than or equal to a second reference value, the application unit 185 or 285 may decrease the level of illumination the current lighting device 200 is giving. The first and second reference values are the values set for the number of characters. That is, the right level of illumination for a predetermined number of characters can be determined by a test. The test shows that if the number of characters is greater than or equal to the first reference value, the proper set value is a first illumination value, and if the number of characters is less than or equal to the second reference value, the proper set value is a second illumination value.

For example, if the recognized object is visual content, the application unit 185 or 285 may calculate the level or color of illumination based on at least one color contained in the visual content. If the recognized objet is visual content which is in blue in many units, the application unit 185 or 285 may illuminate the object in orange which is complementary color of blue. Also, if the recognized objet is visual content which is in red in many units, the application unit 185 or 285 may illuminate the object in green which is complementary color of red. In this case, the person in the room can clearly see at least one color contained in the visual content.

The lighting system according to this exemplary embodiment of the present invention can lessen the fatigue of the user's eyes.

The image processor 181 and 281 may further include an image preprocessor (not shown). The image preprocessor (not shown) may perform preprocessing for changing an acquired image of the eyes of the user into an image suitable for pupil detection. The image preprocessor (not shown) can perform noise reduction, rectification, calibration, color enhancement, color space conversion (CSC), interpolation, camera gain control, etc.

Figure 5:
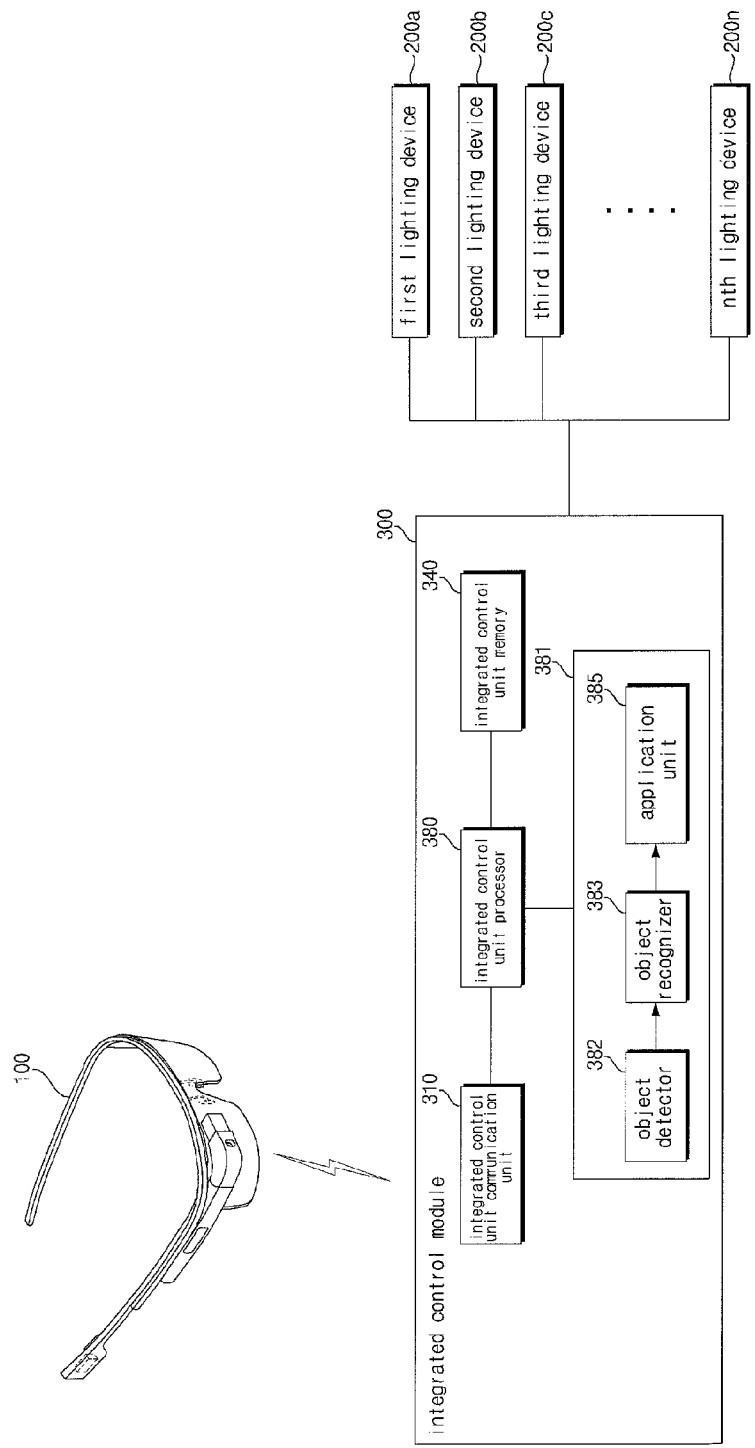
FIG. 5 is a block diagram showing the components of the lighting system according to the exemplary embodiment of the present invention.

FIG. 5 is a block diagram showing the components of a lighting system according to an exemplary embodiment of the present invention.

Referring to FIG. 5, the lighting system according to the exemplary embodiment of the present invention includes a wearable device 100, an integrated control module 300, and a plurality of lighting devices 200 (200*a* to 200*n*).

Descriptions of the wearable device 100 and the lighting devices 200 (200*a* to 200*n*) will be omitted if they are redundant to those made with reference to FIGS. 2 to 4.

The wearable device 100 has at least one camera 160. The wearable device 100 communicates with the integrated control module 300. The wearable device 100 transmits at least one image captured by the camera 160 to the integrated control module 300. The image may be an image of the scene in front of the user. Alternatively, the wearable device 100 may transmit a control signal for controlling the lighting devices 200 (200*a* to 200*n*) to the integrated control module 300 according to an exemplary embodiment.

The integrated control module 300 communicates with the wearable device 10. The integrated control module 300 receives at least one image from the wearable device 100. The image may be an image of the scene in front of the user. The integrated control module 300 detects a readable medium or visual content based on at least one image. The integrated control module 300 controls the number of lighting devices to be activated among the plurality of lighting devices 200 (200*a* to 200*n*), based on the detected readable medium or visual content.

Hereinafter, the operations of the components included in the integrated control module 300 will be described.

The integrated control module 300 includes an integrated control module communication unit 310, an integrated control module memory 340, an integrated control module processor 380, and an image processor 381.

The integrated control module communication unit 310 communicates with the wearable device 100 or the plurality of lighting devices 200 (200*a* to 200*n*).

The integrated control module communication unit 310 is able to communicate with the wearable device 100 over Bluetooth.

The integrated control module communication unit 310 may use communication protocols such as Wi-Fi Direct, RFID (Radio Frequency Identification), IrDA (Infrared Data Association), UWB (Ultra Wideband), ZigBee, and NFC (Near Field Communication), as well as Bluetooth.

The integrated control module communication unit 310 may include an RF (Radio Frequency) circuit. The integrated control module communication unit 310 may send and receive RF signals, i.e., electromagnetic signals. The RF circuit may convert an electrical signal into an electromagnetic signal or vice versa, and communicate with the wearable device 100 using the electromagnetic signal.

For example, the RF circuit may include an antenna system, an RF transceiver, one or more amplifiers, a tuner, one or more oscillators, a digital signal processor, a CODEC chipset, memory, etc. The RF circuit may include well-known circuitry for performing communication functions.

The integrated control module communication unit 310 may receive information sensed by the sensing unit 130 by communicating with the wearable device 100 having the sensing unit 130. For example, the integrated control module communication unit 310 may receive from the wearable device 100 information on the level of illumination in the surrounding environment sensed by the illumination sensor 131.

The integrated control module communication unit 310 may receive from the wearable device 100 image data acquired by the camera 160. For example, the integrated control module communication unit 310 may receive at least one image acquired by the camera 160.

The image processor 381 processes images based on at least one image received from the integrated control communication unit 310.

The integrated control module memory 340 may store data and commands for operating the plurality of lighting devices 200 (200*a* to 200*n*).

The integrated control module memory 340 may store data received from the wearable device 100. For example, the integrated control module memory 340 may store at least one image received from the wearable device 100. Alternatively, the integrated control module memory 340 may store data on a readable medium or visual content that is detected from at least one image received from the wearable device 100. Alternatively, the integrated control module memory 340 may store control signals received from the wearable device 100.

The integrated control module memory 340 may store preset PIN (Personal Identification Number) information of the wearable device 100 which is used for communications security.

The integrated control module memory 340 may include non-volatile memory, such as one or more magnetic disk storage devices, flash memory devices, or other non-volatile solid state memory devices. The present invention is not limited to these examples, and the integrated control module memory 340 may include a readable storage medium.

For example, the integrated control module memory 340 may include EEP-ROM (Electronically Erasable and Programmable Read Only Memory). Information can be written to or erased from EEP-ROM by the integrated control module processor 380 during the operation of the integrated control module processor 380. EEP-ROM may be a memory device that keeps the information stored in it without erasing it even when power is lost.

The integrated control module processor 380 receives data from the integrated control module communication unit 310. The integrated control module processor 380 controls the plurality of lighting devices 200 (200a to 200n) based on the received data. That is, the integrated control module processor 380 adjusts the number of lights when activated by transmitting a control signal to the plurality of lighting devices 200 (200a to 200n).

The integrated control module processor 380 may generate control signals based on data received from the image processor 381.

The integrated control module processor 380 may generate control signals based on data stored in the integrated control module memory 340.

If a plurality of wearable devices 100 are positioned in proximity to the integrated control module 300, this may cause a problem with the communication connection between the integrated control module 300 and the plurality of wearable devices 100.

In this case, the integrated control module 380 only communicates with any wearable devices 100 that are authenticated based on the PIN information of the wearable devices 100 stored in the integrated control module memory 340. If there are a plurality of authenticated wearable devices 100, the integrated control module 300 forms a communication channel with the first wearable device 100a with the highest priority.

The image processor 381 detects a readable medium or visual content based on at least one received image. The image processor 381 may calculate the level or color of illumination corresponding to the readable medium or visual content.

The image processor 381 includes an object detector 382, an object recognizer 383, and an application unit 385.

The object detector 382 detects an object from an image received from the wearable device 100. For example, the object detector 382 detects a readable medium or visual content. The readable medium may refer to a medium that contains multiple characters that a person in a room can read. Examples of the readable medium may include a book, newspaper, a magazine, a notebook, an electronic document displayed on a terminal, etc. Examples of the visual content may include a photograph, a video, etc. The visual content may be displayed on a predetermined terminal. The terminal includes a mobile phone, a smartphone, a desktop computer, a notebook computer, a digital broadcast terminal, a PDA (Personal Digital Assistant), a PMP (Portable Multimedia Player), a navigation system, a tablet computer, an e-book reader, and the like.

The object detector 382 may detect a readable medium or visual content by using at least one of the following properties: intensity, color, histogram, feature point, shape, space position, and motion.

The object recognizer 383 classifies and recognizes a detected object. To this end, the object recognizer 383 may use a recognition technique using a neural network, an SVM (Support Vector Machine) technique, a recognition technique using AdaBoost with Haar-like features, or a HOG (Histograms of Oriented Gradients) technique.

The object recognizer 383 compares the objects stored in the memory 340 with a detected object to recognize it. For example, the object recognizer 383 may classify and recognize a readable medium or visual content.

The application unit 385 may calculate the level or color of illumination based on the recognized object.

For example, if the recognized object is a readable medium, the application unit 385 may calculate the right level or color of illumination for the size of the characters written on the readable medium.

For example, if the recognized object is a readable medium, the application unit 385 may calculate the number of lighting devices to be activated among the plurality of lighting devices 200 which is suitable for the size of the characters written on the readable medium.

For example, if the recognized object is a readable medium, the application unit 385 may calculate the right level or color of illumination for the number of the characters contained in the readable medium. In this case, if the number of the characters contained in the readable medium is greater than or equal to a first reference value, the application unit 385 may increase the level of illumination the current lighting device 200 is giving. Also, if the number of the characters contained in the readable medium is less than or equal to a second reference value, the application unit 385 may decrease the level of illumination the current lighting device 200 is giving. The first and second reference values are the values set for the number of characters. That is, the right level of illumination for a predetermined number of characters can be determined by a test. The test shows that if the number of characters is greater than or equal to the first reference value, the proper set value is a first illumination value, and if the number of characters is less than or equal to the second reference value, the proper set value is a second illumination value.

For example, if the recognized object is a readable medium, the application unit 385 may calculate the number of lighting devices to be activated among the plurality of lighting devices 200 which is suitable for the size of the characters contained in the readable medium. In this case, if the number of the characters contained in the readable medium is greater than or equal to the first reference value, the application unit 385 may increase the number of lighting devices to be activated among the plurality of lighting devices 200. If the number of the characters contained in the readable medium is less than or equal to the second reference value, the application unit 385 may decrease the number of lighting devices to be activated among the plurality of lighting devices 200.

For example, if the recognized object is visual content, the application unit 385 may calculate the level or color of illumination based on at least one color contained in the visual content. If the recognized objet is visual content which is in blue in many units, the application unit 385 may illuminate the object in orange which is complementary color of blue. Also, if the recognized objet is visual content which is in red in many units, the application unit 385 may illuminate the object in green which is complementary color of red. In this case, the person in the room can clearly see at least one color contained in the visual content.

The image processor 381 may further include an image preprocessor (not shown). The image preprocessor (not shown) may perform preprocessing for changing an acquired image of the eyes of the user into an image suitable for pupil detection. The image preprocessor (not shown) can perform noise reduction, rectification, calibration, color enhancement, color space conversion (CSC), interpolation, camera gain control, etc.

Figure 6A:
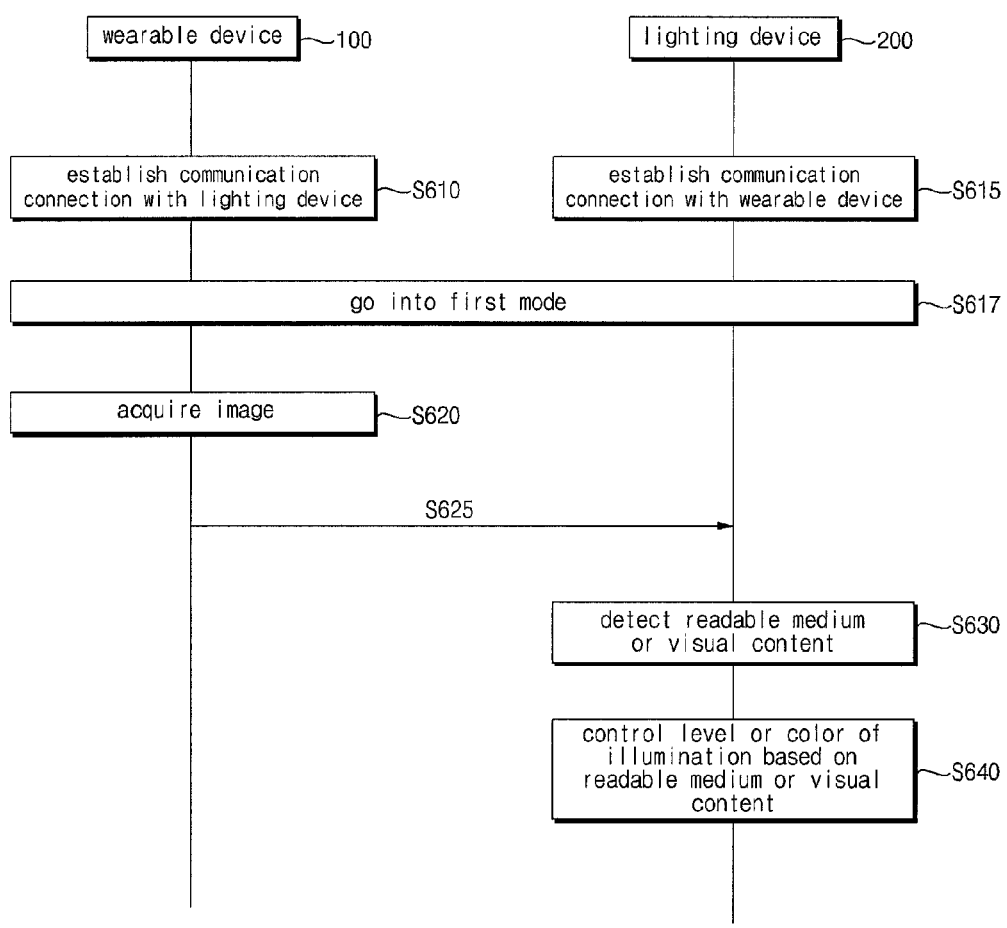
FIGS. 6a and 6b are signal-flow charts of a lighting system according to a first exemplary embodiment of the present invention.
Figure 6B:
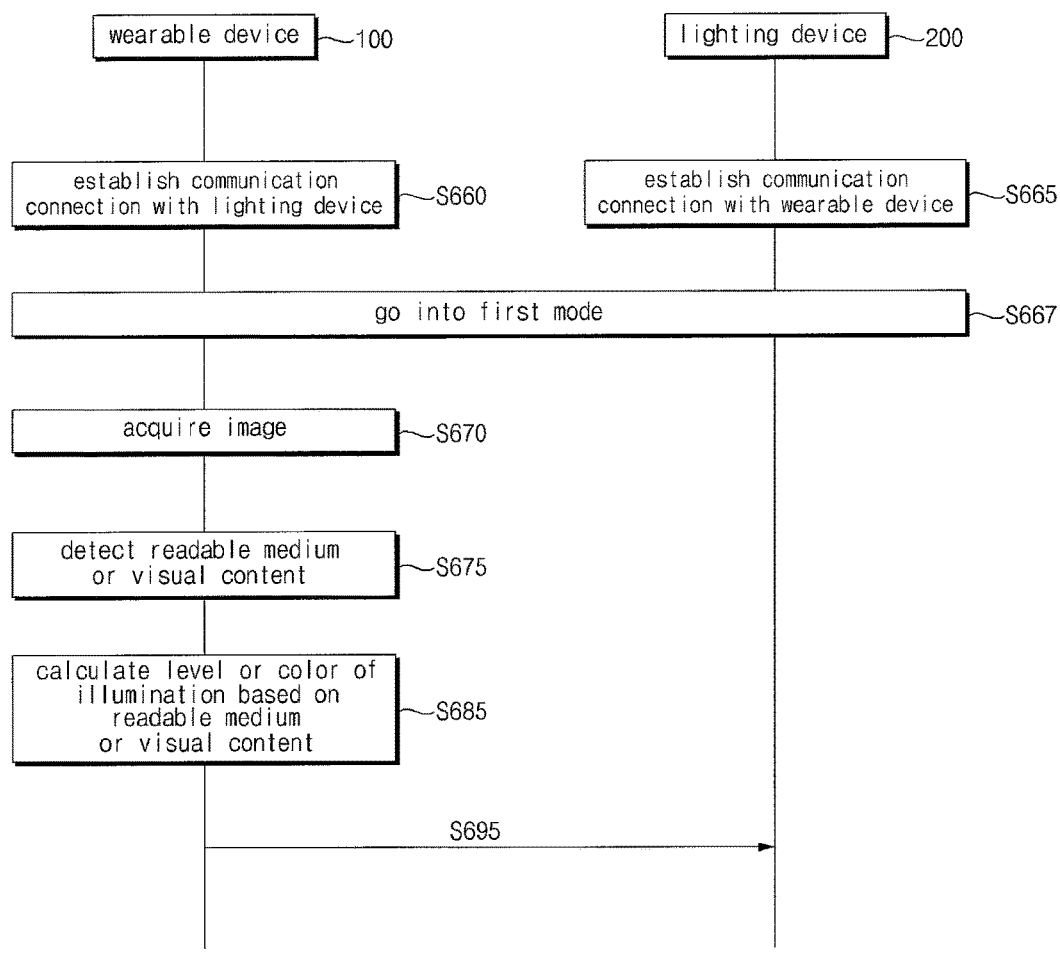

FIGS. 6*a* and 6*b* are signal-flow charts of a lighting system according to a first exemplary embodiment of the present invention.

FIG. 6*a* illustrates that the lighting device 200 includes the image processor 281. FIG. 6*b* illustrates that the wearable device 100 includes the image processor 181.

Referring to FIG. 6*a*, the wearable device 100 forms a communication channel with the lighting device 200. That is, the wearable device 100 establishes a communication connection with the lighting device 200 (S610 and S615).

While connected to the lighting device 200 for communication, the wearable device 100 goes into the first mode (S617). Alternatively, the lighting device 200 goes into the first mode. The first mode may be a mode for controlling lighting based on at least one image acquired by the camera 160 while the wearable device 100 and the lighting device 200 are connected for communication. In this case, the wearable device controller 180 may receive user input through the wearable device input unit 120 to go into the first mode. Alternatively, the controller 280 may receive user input through the input unit 220 to go into the first mode.

While in the first mode, the wearable device 100 acquires at least one image by the camera 160 (S620). The image may be an image of the scene in front of the user. The camera 160 may acquire a plurality of images of the scene in front of the user for a predetermined period of time. The period of time and the number of acquired images are set values.

Once at least one image is acquired, the wearable device 100 transmits the at least one image to the lighting device 200 through the wireless communication unit 110 (S625). The lighting device 200 receives at least one image from the wearable device 100 through the communication unit 210.

Once at least one image is received, the lighting device 200 detects a readable medium or visual content from the at least one image (S630).

The readable medium may refer to a medium that contains multiple characters that a person in a room can read. Examples of the readable medium may include a book, newspaper, a magazine, a notebook, an electronic document displayed on a terminal, etc. Examples of the visual content may include a photograph, a video, etc. The visual content may be displayed on a predetermined terminal. The terminal includes a mobile phone, a smartphone, a desktop computer, a notebook computer, a digital broadcast terminal, a PDA (Personal Digital Assistant), a PMP (Portable Multimedia Player), a navigation system, a tablet computer, an e-book reader, and the like.

Once a readable medium or visual content is detected, the lighting device 200 controls the level or color of illumination based on the readable medium or visual content (S640).

Referring to FIG. 6*b*, the wearable device 100 forms a communication channel with the lighting device 200. That is, the wearable device 100 establishes a communication connection with the lighting device 200 (S660 and S665).

While connected to the lighting device 200 for communication, the wearable device 100 goes into the first mode (S667). Alternatively, the lighting device 200 goes into the first mode.

While in the first mode, the wearable device 100 acquires at least one image by the camera 160 (S670). The image may be an image of the scene in front of the user. The camera 160 may acquire a plurality of images for a predetermined period of time.

Once at least one image is acquired, the wearable device 100 detects a readable medium or visual content from the at least one image (S675)

Once a readable medium or visual content is detected, the wearable device 100 calculates the level or color of illumination based on the readable medium or visual content (S685).

Once the level or color of illumination is calculated, the wearable device 100 transmits a signal for controlling the level or color of illumination from the lighting device 200 (S695).

Figure 7A:
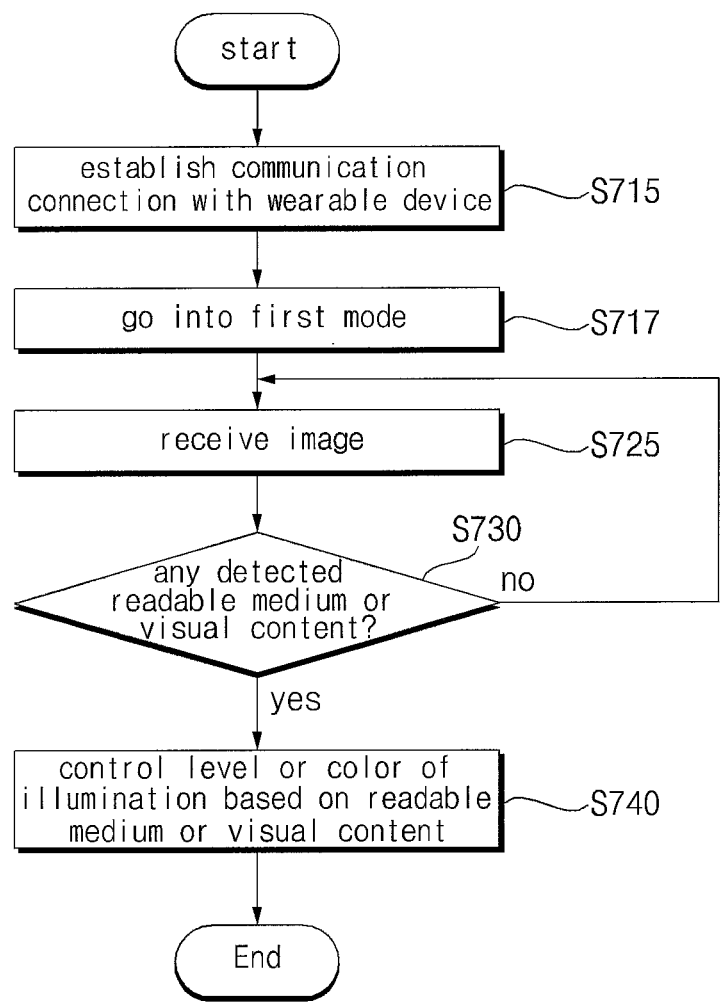
FIGS. 7a and 7b are flowcharts illustrating the operation of the lighting system according to the first exemplary embodiment of the present invention.
Figure 7B:
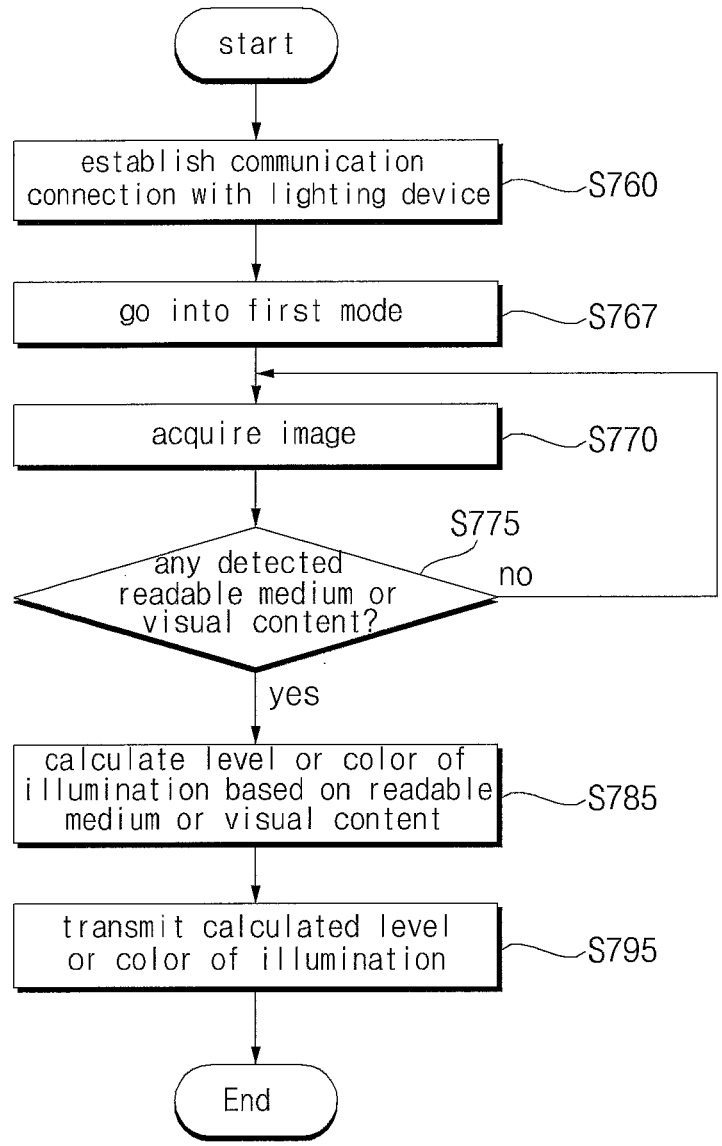

FIGS. 7*a* and 7*b* are flowcharts illustrating the operation of the lighting system according to the first exemplary embodiment of the present invention.

FIG. 7*a* is a flowchart referenced for describing the operation of the lighting device 200 according to the first exemplary embodiment of the present invention.

Referring to FIG. 7*a*, the controller 280 establishes a communication connection with the wearable device 100 via the communication unit 210 (S715).

While connected to the wearable device 100 for communication, the controller 280 goes into the first mode (S717). The first mode may be a mode for controlling lighting based on at least one image acquired by the camera 160 while the wearable device 100 and the lighting device 200 are connected for communication. The controller 280 may receive user input through the input unit 220 to go into the first mode.

While in the first mode, the controller 280 receives at least one image from the wearable device 100 (S725). The at least one mage may be an image of the scene in front of the user that is acquired by the camera 160 included in the wearable device 100. The camera 160 may acquire a plurality of images of the scene in front of the user for a predetermined period of time. The period of time and the number of acquired images are set values.

Once at least one image is received, the controller 280 detects a readable medium or visual content from the at least one image (S730). Specifically, the operation of detecting a readable medium or visual content may be performed by the object detector 282 included in the image processor 281, as explained with reference to FIG. 4.

The readable medium may refer to a medium that contains multiple characters that a person in a room can read. Examples of the readable medium may include a book, newspaper, a magazine, a notebook, an electronic document displayed on a terminal, etc. Examples of the visual content may include a photograph, a video, etc. The visual content may be displayed on a predetermined terminal. The terminal includes a mobile phone, a smartphone, a desktop computer, a notebook computer, a digital broadcast terminal, a PDA (Personal Digital Assistant), a PMP (Portable Multimedia Player), a navigation system, a tablet computer, an e-book reader, and the like.

Once a readable medium or visual content is detected, the controller 280 controls the level or color of illumination based on the readable medium or visual content (S740).

The controller 280 may classify and recognize a readable medium or visual content by comparing it with the objects stored in the memory 240. Specifically, the classification and recognition of a readable medium or visual content may be performed by the object recognizer 283 included in the image processor 281, as explained with reference to FIG. 4.

The controller 280 calculates the level or color of illumination based on the recognized readable medium or visual content. Specifically, the calculation of the level or color of illumination based on a readable medium or visual content may be performed by the application unit 285 included in the image processor 281, as explained with reference to FIG. 4.

For example, if a readable medium is recognized, the controller 280 may calculate the right level or color of illumination for the size of the characters written on the readable medium.

For example, if a readable medium is recognized, the controller 280 may calculate the right level or color of illumination for the number of the characters contained in the readable medium. In this case, if the number of the characters contained in the readable medium is greater than or equal to a first reference value, the controller 280 may increase the level of illumination the current lighting device 200 is giving. Also, if the number of the characters contained in the readable medium is less than or equal to a second reference value, the controller 280 may decrease the level of illumination the current lighting device 200 is giving. The first and second reference values are the values set for the number of characters. That is, the right level of illumination for a predetermined number of characters can be determined by a test. The test shows that if the number of characters is greater than or equal to the first reference value, the proper set value is a first illumination value, and if the number of characters is less than or equal to the second reference value, the proper set value is a second illumination value.

For example, if visual content is recognized, the controller 280 may calculate the level or color of illumination based on at least one color contained in the visual content. If the recognized objet is visual content which is in blue in many units, the controller 280 may illuminate the object in orange which is complementary color of blue. Also, if the recognized objet is visual content which is in red in many units, the controller 280 may illuminate the object in green which is complementary color of red. In this case, the person in the room can clearly see at least one color contained in the visual content.

The controller 280 transmits a control signal to the drive unit 260 based on the calculated level or color of illumination to control the level or color of illumination from the light emitting unit 270.

FIG. 7b is a flowchart referenced for describing the operation of the wearable device 100 according to the first exemplary embodiment of the present invention.

Referring to FIG. 7b, the wearable device controller 180 establishes a communication connection with the lighting device 200 via the wireless communication unit 110 (5760).

While connected to the lighting device 200 for communication, the wearable device controller 180 goes into the first mode (S767). The first mode may be a mode for controlling lighting based on at least one image acquired by the camera 160 while the wearable device 100 and the lighting device 200 are connected for communication. The wearable device controller 180 may receive user input through the wearable device input unit 120 to go into the first mode.

While in the first mode, the wearable device controller 180 acquires at least one image from the wearable device 100 (S770). The at least one mage may be an image of the scene in front of the user that is acquired by the camera 160 included in the wearable device 100. The camera 160 may acquire a plurality of images for a predetermined period of time. The period of time and the number of acquired images are set values.

Once at least one image is acquired, the wearable device controller 180 detects a readable medium or visual content from the at least one image (S775). Specifically, the operation of detecting a readable medium or visual content may be performed by the object detector 182 included in the image processor 181, as explained with reference to FIG. 4.

Once a readable medium or visual content is detected, the wearable device controller 180 controls the level or color of illumination based on the readable medium or visual content (S785).

The wearable device controller 180 may classify and recognize a readable medium or visual content by comparing it with the objects stored in the wearable device memory 140. Specifically, the classification and recognition of a readable medium or visual content may be performed by the object recognizer 183 included in the image processor 181, as explained with reference to FIG. 4.

The wearable device controller 180 calculates the level or color of illumination based on the recognized readable medium or visual content. Specifically, the calculation of the level or color of illumination based on a readable medium or visual content may be performed by the application unit 185 included in the image processor 181, as explained with reference to FIG. 4.

For example, if a readable medium is recognized, the wearable device controller 180 may calculate the right level or color of illumination for the number of the characters contained in the readable medium. In this case, if the number of the characters contained in the readable medium is greater than or equal to a first reference value, the wearable device controller 180 may increase the level of illumination the current lighting device 200 is giving. Also, if the number of the characters contained in the readable medium is less than or equal to a second reference value, the wearable device controller 180 may decrease the level of illumination the current lighting device 200 is giving. The first and second reference values are the values set for the number of characters. That is, the right level of illumination for a predetermined number of characters can be determined by a test. The test shows that if the number of characters is greater than or equal to the first reference value, the proper set value is a first illumination value, and if the number of characters is less than or equal to the second reference value, the proper set value is a second illumination value.

For example, if visual content is recognized, the wearable device controller 180 may calculate the level or color of illumination based on at least one color contained in the visual content. In this case, the person in the room can clearly see at least one color contained in the visual content.

Once the level or color of illumination is calculated, the wearable device controller 180 transmits information on the calculated level or color of illumination to the lighting device 200 (S795).

The lighting device 200 receives the information on the calculated level or color of illumination from the wearable device 200, and accordingly transmits a control signal to the drive unit 260 to control the level or color of illumination from the light emitting unit 270.

Figure 8:
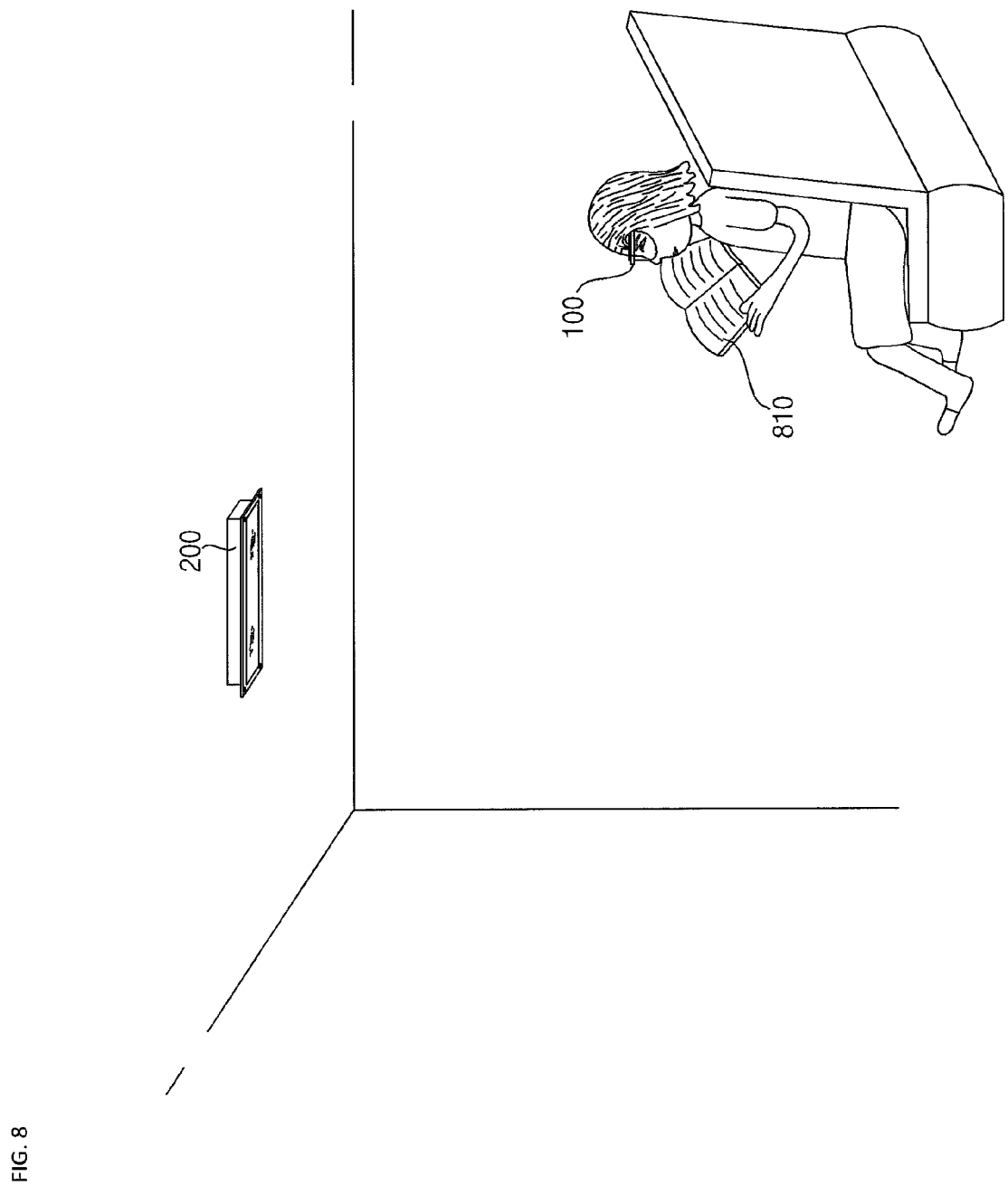
FIG. 8 is an illustration of the operation of the lighting system according to the first exemplary embodiment of the present invention.

FIG. 8 is an illustration of the operation of the lighting system according to the first exemplary embodiment of the present invention.

Referring to FIG. 8, the controller 280 establishes a communication connection with the wearable device 100 via the communication unit 210. While connected to the wearable device 100 for communication, the controller 280 goes into the first mode. While in the first mode, the controller 280 receives at least one image from the wearable device 100. The image may be an image of the scene in front of the user. Once at least one image is received, the controller 280 detects a readable medium 810 or visual content from the at least one image. If the readable medium 810 or visual content is detected, the controller 280 classifies and recognizes the readable medium 810 or visual content by comparing it with the objects stored in the memory 240. The controller 280 calculates the level or color of illumination based on the recognized readable medium 810 or visual content. The controller 280 transmits a control signal to the drive unit 260 based on the calculated level or color of illumination to control the level or color of illumination from the light emitting unit 270.

Figure 9A:
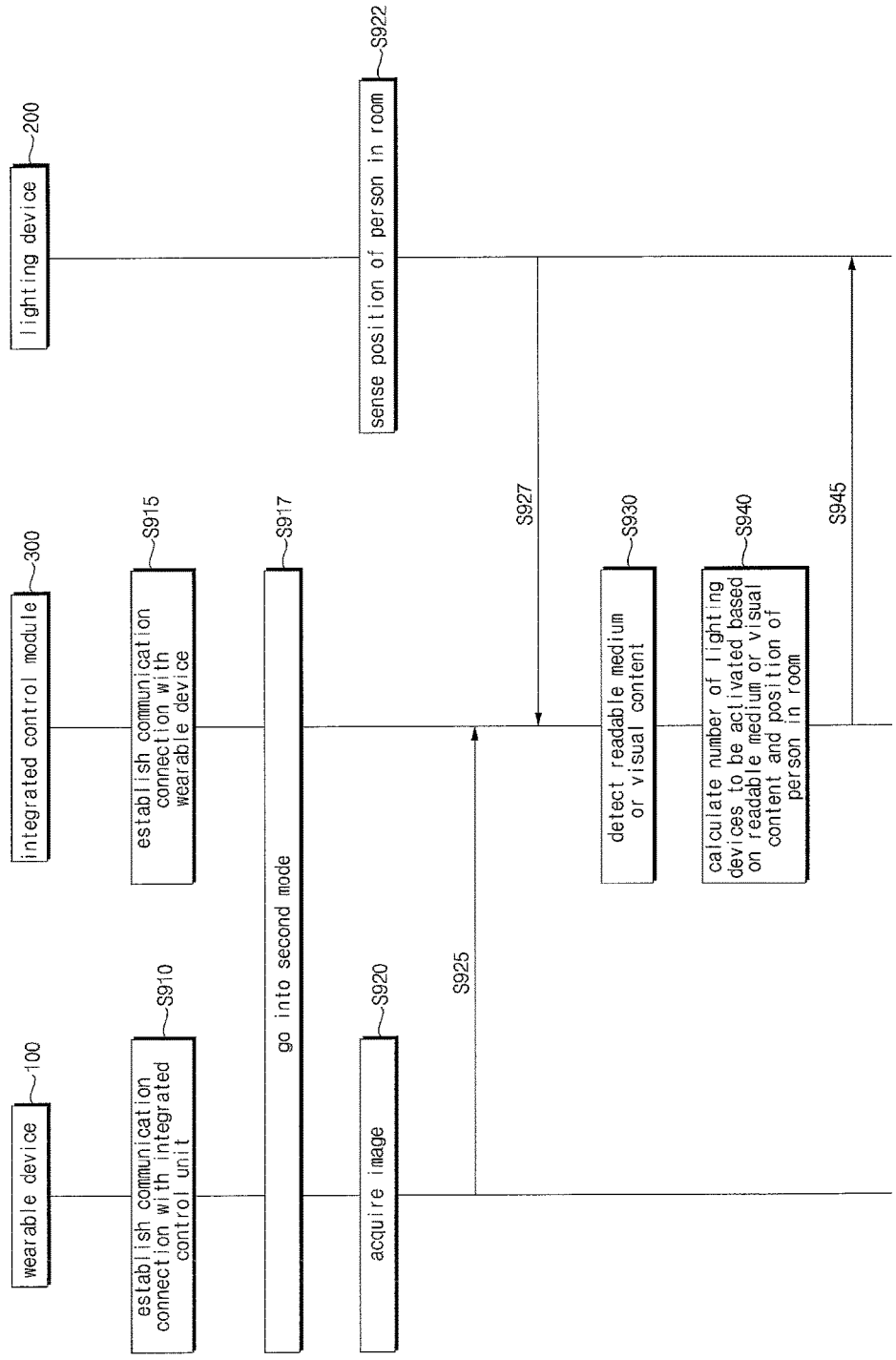
FIGS. 9a and 9b are signal-flow charts of a lighting system according to a second exemplary embodiment of the present invention.
Figure 9B:
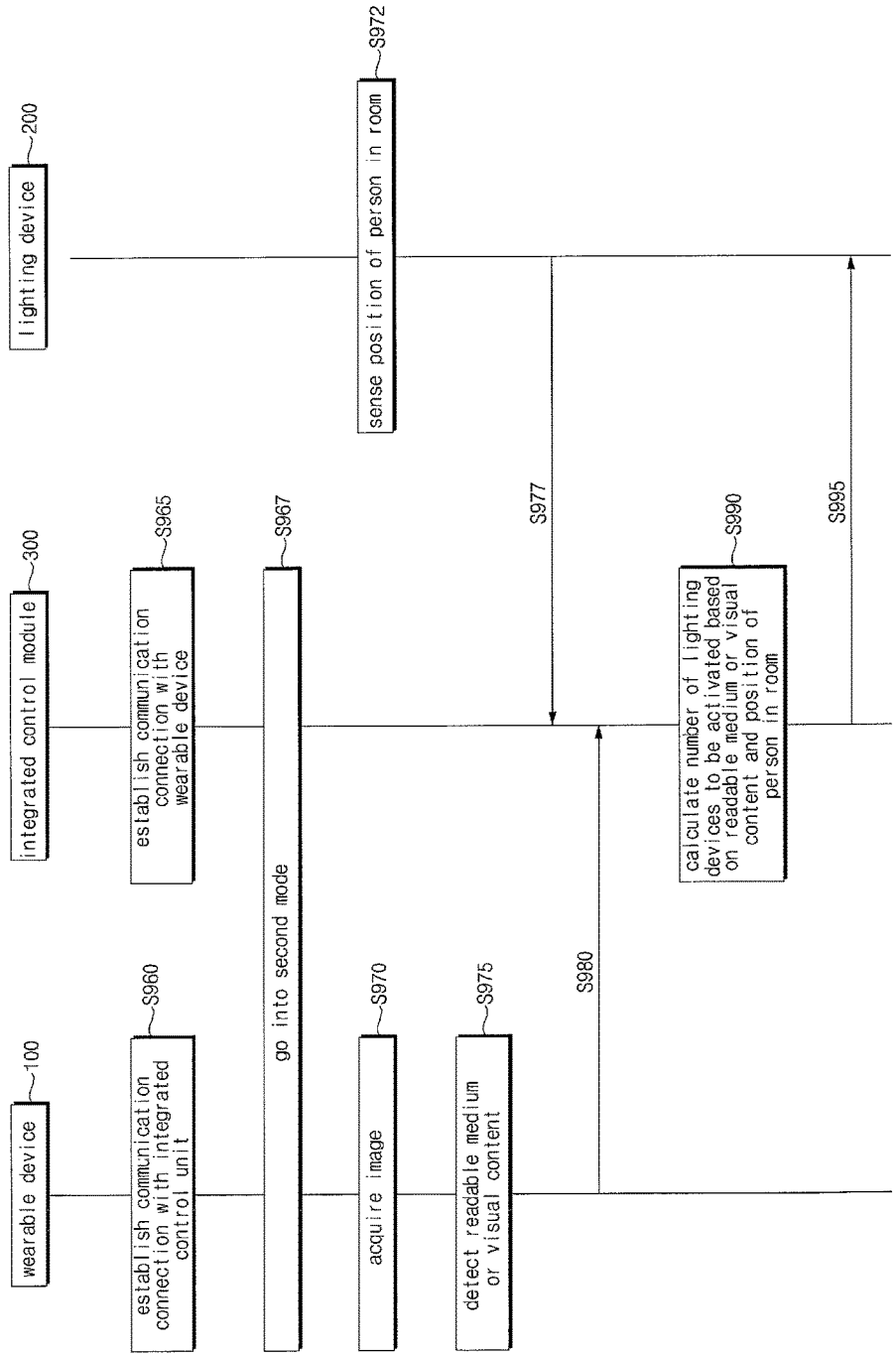

FIGS. 9a and 9b are signal-flow charts of a lighting system according to a second exemplary embodiment of the present invention.

FIG. 9a illustrates that the integrated control module 300 includes the image processor 381. FIG. 9b illustrates that the wearable device 100 includes the image processor 181.

Referring to FIG. 9a, the wearable device 100 forms a communication channel with the integrated control module 300. That is, the wearable device 100 establishes a communication connection with the integrated control module 300 (S910 and S915).

While connected to the integrated control module 300 for communication, the wearable device 100 goes into the second mode (S917). Alternatively, the integrated control module 300 goes into the second mode. The second mode may be a mode for controlling lighting based on at least one image acquired by the camera 160 while the wearable device 100 and the integrated control module 300 are connected for communication. In this case, the wearable device controller 180 may receive user input through the wearable device input unit 120 to go into the second mode.

While in the second mode, the wearable device 100 acquires at least one image by the camera 160 (S920). The image may be an image of the scene in front of the user. The camera 160 may acquire a plurality of images for a predetermined period of time. The period of time and the number of acquired images are set values.

Once at least one image is acquired, the wearable device 100 transmits the at least one image to the integrated control module 300 through the wireless communication unit 110 (S925).

The lighting device 200 senses the position of person in a room through the person-in-room sensing unit 230 (S922).

Once the position of a person in a room is sensed, the lighting device 200 transmits information on the position of the person in the room to the integrated control module 300 (S927).

The steps S920 and S925 performed by the wearable device 100 and the steps S922 and S927 performed by the lighting device 200 may be done simultaneously or at different times. Also, unlike these figures, the steps S922 and S927 performed by the lighting device 200 may be done earlier than the steps S920 and S925 performed by the wearable device 100.

Once at least one image is received from the wearable device 100 and the information on the position of the person in the room is received from the lighting device 200, the integrated control module 300 detects a readable medium or visual content from the at least one image (S930).

The readable medium may refer to a medium that contains multiple characters that a person in a room can read. Examples of the readable medium may include a book, newspaper, a magazine, a notebook, an electronic document displayed on a terminal, etc. Examples of the visual content may include a photograph, a video, etc. The visual content may be displayed on a predetermined terminal. The terminal includes a mobile phone, a smartphone, a desktop computer, a notebook computer, a digital broadcast terminal, a PDA (Personal Digital Assistant), a PMP (Portable Multimedia Player), a navigation system, a tablet computer, an e-book reader, and the like.

Once a readable medium or visual content is detected, the integrated control module 300 calculates the number of lighting devices 200 to be activated based on the readable medium or visual content and the position of the person in the room (S940).

Afterwards, the integrated control module 300 transmits a control signal to the lighting device 200 based on the calculation results (S945).

For example, once a readable medium or visual content is detected, the position of a person in a room may be detected. That is, the person-in-room sensing unit 230 included in some of the plurality of lighting devices 200 may receive a sensing signal. In this case, the integrated control module 300 may activate any lighting device that includes the person-in-room sensing unit 230 that has received the sensing signal; whereas the integrated control module 300 may deactivate any lighting device that includes the person-in-room sensing unit 230 that has not received the sensing signal.

The integrated control module 300's operation of calculating the level or color of illumination based on a readable medium or visual content and controlling the plurality of lighting devices 200 based on the calculated level or color of illumination will be described in detail with reference to FIGS. 6 to 8.

Referring to FIG. 9b, the wearable device 100 forms a communication channel with the integrated control module 300. That is, the wearable device 100 establishes a communication connection with the integrated control module 300 (S960 and S965).

While connected to the integrated control module 300 for communication, the wearable device 100 goes into the second mode (S967). Alternatively, the lighting device 200 goes into the second mode.

While in the second mode, the wearable device 100 acquires at least one image by the camera 160 (S970). The camera 160 may acquire a plurality of images for a predetermined period of time.

Once at least one image is acquired, the wearable device 100 detects a readable medium or visual content from the at least one image (S975).

Once a readable medium or visual content is detected, the wearable device 100 transmits information on the detected readable medium or visual content to the integrated control module 300 through the wireless communication unit 110 (S980).

The lighting device 200 senses the position of person in a room through the person-in-room sensing unit 230 (S972).

Once the position of a person in a room is sensed, the lighting device 200 transmits information on the position of the person in the room to the integrated control module 300 (S977).

The steps S975 and S980 performed by the wearable device 100 and the steps S972 and S977 performed by the lighting device 200 may be done simultaneously or at different times. Also, unlike these figures, the steps S972 and S977 performed by the lighting device 200 may be done earlier than the steps S975 and S980 performed by the wearable device 100.

Once the information on the readable medium or visual content is received, the integrated control module 300 calculates the number of lighting devices 200 to be activated based on the readable medium or visual content and the position of the person in the room (S990).

Afterwards, the integrated control module 300 transmits a control signal to the lighting device 200 based on the calculation results (S995).

For example, once the information on the readable medium or visual content is received, the position of a person in a room may be detected. That is, the person-in-room sensing unit 230 included in some of the plurality of lighting devices 200 may receive a sensing signal. In this case, the integrated control module 300 may activate any lighting device so long as it includes the person-in-room sensing unit 230 that has received the sensing signal; whereas the integrated control module 300 may deactivate any lighting device so long as it includes the person-in-room sensing unit 230 that has not received the sensing signal.

The integrated control module 300's operation of calculating the level or color of illumination based on a readable medium or visual content and controlling the plurality of lighting devices 200 based on the calculated level or color of illumination will be described in detail with reference to FIGS. 6 to 8.

Figure 10A:
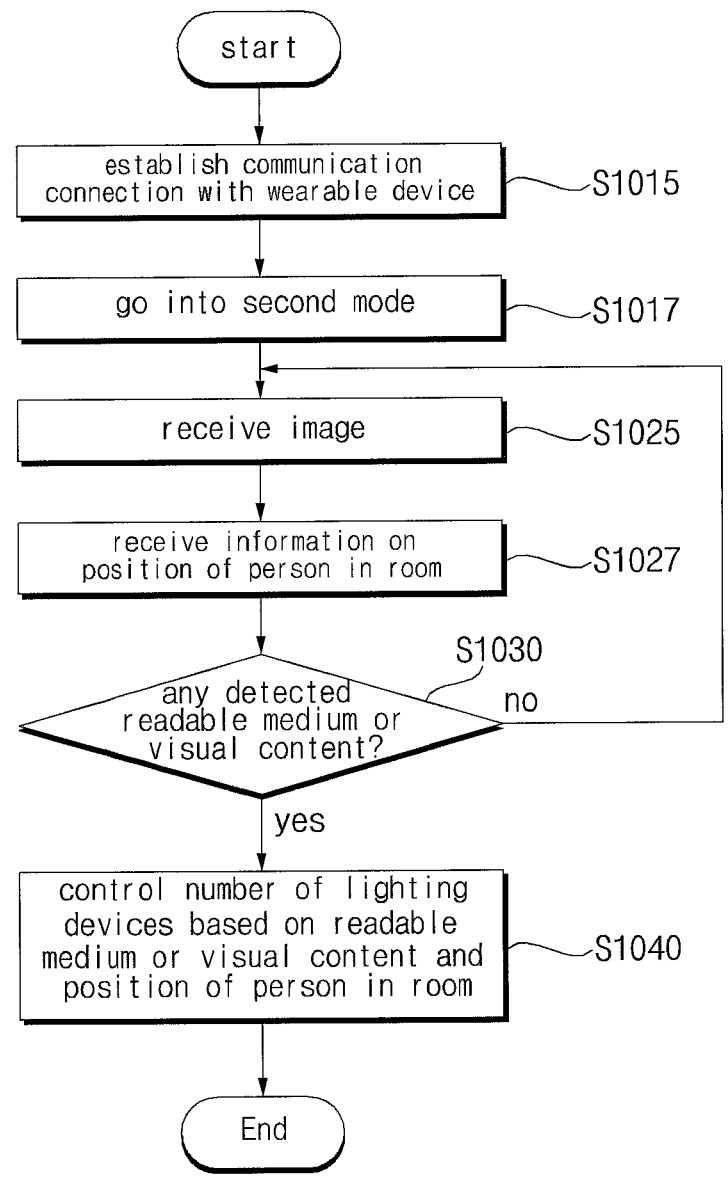
FIGS. 10a and 10b are flowcharts illustrating the operation of the lighting system according to the second exemplary embodiment of the present invention.
Figure 10B:
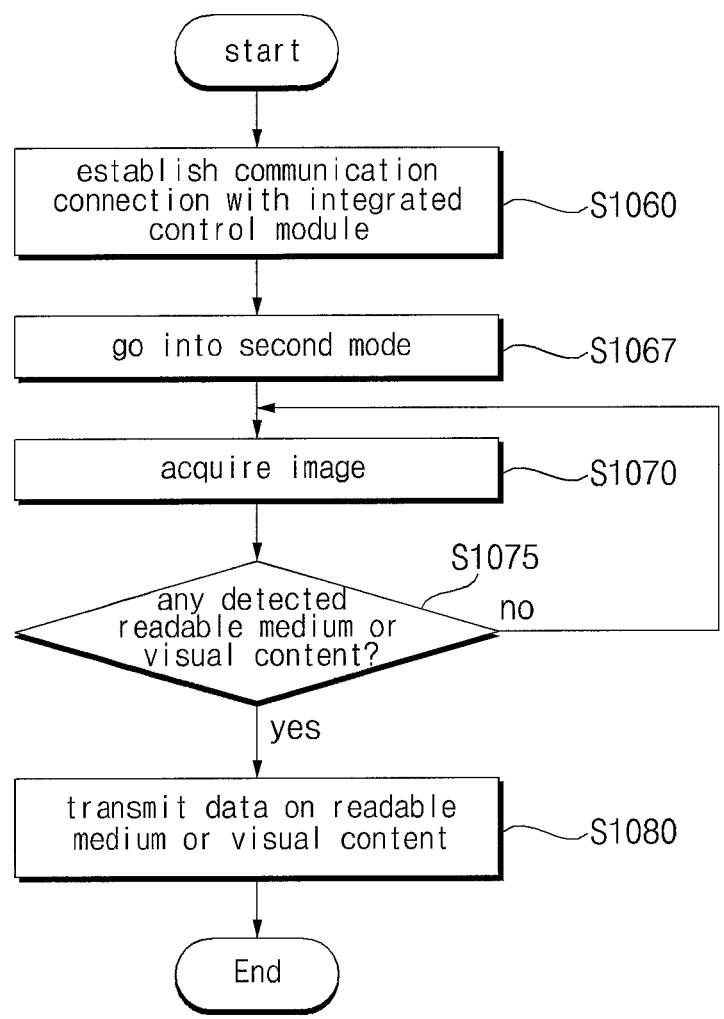

FIGS. 10a and 10b are flowcharts illustrating the operation of the lighting system according to the second exemplary embodiment of the present invention.

FIG. 10a is a flowchart referenced for describing the operation of the lighting device 200 according to the second exemplary embodiment of the present invention.

Referring to FIG. 10a, the integrated control module processor 380 establishes a communication connection with the wearable device 100 via the integrated control module communication unit 310 (S1015).

While connected to the wearable device 100 for communication, the integrated control module processor 380 goes into the second mode (S1017). The second mode may be a mode for controlling lighting based on at least one image acquired by the camera 160 while the wearable device 100 and the integrated control module 300 are connected for communication. The integrated control module processor 380 may receive user input through an integrated control module processor input unit (not shown) to go into the second mode.

While in the second mode, the integrated control module processor 380 receives at least one image from the wearable device 100 (S1025). The at least one image may be an image of the scene in front of the user that is acquired by the camera 160 included in the wearable device 100. The camera 160 may acquire a plurality of images for a predetermined period of time. The period of time and the number of acquired images are set values.

The integrated control module processor 380 receives information on the position of a person in a room from the lighting device 200 (S1027).

Once at least one image is received from the wearable device 100 and the information on the position of the person in the room is received from the lighting device 200, the integrated control module processor 380 detects a readable medium or visual content from the at least one image (S1030).

The readable medium may refer to a medium that contains multiple characters that a person in a room can read. Examples of the readable medium may include a book, newspaper, a magazine, a notebook, an electronic document displayed on a terminal, etc. Examples of the visual content may include a photograph, a video, etc. The visual content may be displayed on a predetermined terminal. The terminal includes a mobile phone, a smartphone, a desktop computer, a notebook computer, a digital broadcast terminal, a PDA (Personal Digital Assistant), a PMP (Portable Multimedia Player), a navigation system, a tablet computer, an e-book reader, and the like.

Once a readable medium or visual content is detected, the integrated control module processor 380 controls the lighting device 200 based on the readable medium or visual content and the position of the person in the room (S1040).

For example, once a readable medium or visual content is detected, the position of a person in a room may be detected. That is, the person-in-room sensing unit 230 included in some of the plurality of lighting devices 200 may receive a sensing signal. In this case, the integrated control module 300 may activate any lighting device so long as it includes the person-in-room sensing unit 230 that has received the sensing signal; whereas the integrated control module 300 may deactivate any lighting device so long as it includes the person-in-room sensing unit 230 that has not received the sensing signal.

The integrated control module 300's operation of calculating the level or color of illumination based on a readable medium or visual content and controlling the plurality of lighting devices 200 based on the calculated level or color of illumination will be described in detail with reference to FIGS. 6 to 8.

FIG. 10b is a flowchart referenced for describing the operation of the wearable device 100 according to the second exemplary embodiment of the present invention.

Referring to FIG. 10b, the wearable device controller 180 establishes a communication connection with the integrated control module 300 via the wireless communication unit 110 (S1060).

While connected to the integrated control module 300 for communication, the wearable device controller 180 goes into the second mode (S1067).

While in the second mode, the wearable device controller 180 receives at least one image from the wearable device 100 (S1070). The at least one image may be an image of the scene in front of the user that is acquired by the camera 160 included in the wearable device 100. The camera 160 may acquire a plurality of images for a predetermined period of time. The period of time and the number of acquired images are set values.

Once at least one image is acquired, the wearable device 190 detects a readable medium or visual content from the at least one image (S1075). Specifically, the operation of detecting a readable medium or visual content may be performed by the object detector 182 included in the image processor 181, as explained with reference to FIG. 4.

Once a readable medium or visual content is detected, the wearable device controller 180 calculates the level or color of illumination based on the readable medium or visual content.

The wearable device controller 180 may classify and recognize a readable medium or visual content by comparing it with the objects stored in the wearable device memory

140. Specifically, the classification and recognition of a readable medium or visual content may be performed by the object recognizer 183 included in the image processor 181, as explained with reference to FIG. 4.

The wearable device controller 180 calculates the level or color of illumination based on the recognized readable medium or visual content. Specifically, the calculation of the level or color of illumination based on a readable medium or visual content may be performed by the application unit 185 included in the image processor 181, as explained with reference to FIG. 4.

Once the level or color of illumination is detected, the wearable device controller 180 transmits data on a detected readable medium or visual content to the integrated control module 300 (S1080).

According to an exemplary embodiment, once the level or color of illumination is calculated, the wearable device controller 180 may transmit information on the calculated level or color of illumination to the integrated control module 300.

Figure 11:
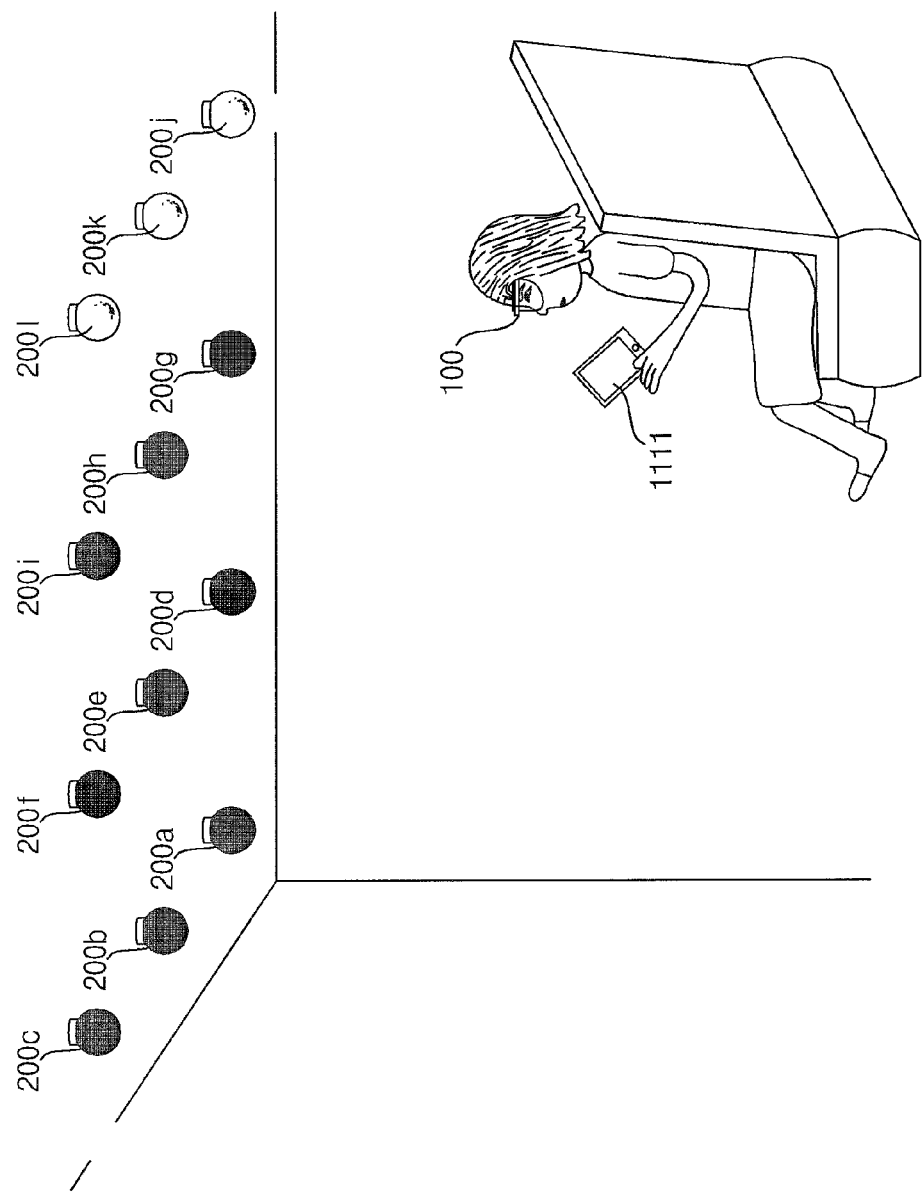
FIG. 11 is an illustration of the operation of the lighting system according to the second exemplary embodiment of the present invention.

FIG. 11 is an illustration of the operation of the lighting system according to the second exemplary embodiment of the present invention.

Referring to FIG. 11, the integrated control module processor 380 establishes a communication connection with the wearable device 100 via the integrated control module communication unit 310. While connected to the wearable device 100 for communication, the integrated control module processor 380 goes into the second mode. While in the second mode, the integrated control module processor 380 receives at least one image from the wearable device 100. Also, the integrated control module processor 380 receives information on the position of a person in a room from the lighting device 200. Once at least one image is received from the wearable device 100 and the information on the position of the person in the room is received from the lighting device 200, the integrated control module processor 380 detects a readable medium or visual content 1111 from the at least one image. If the readable medium or visual content 1111 is detected, the integrated control module processor 380 controls the lighting device 200 based on the readable medium or visual content 1111 and the position of the person in the room.

In this illustration, once the readable medium or visual content 1111 is detected, the person in the room is sensed by the person-in-room sensing unit 230*j* of the tenth lighting device 200*j*, the person-in-room sensing unit 230*k* of the eleventh lighting device 200*k*, and the person-in-room sensing unit 230*l* of the twelfth lighting device 200*l*. In this case, the integrated control module processor 380 controls the tenth lighting device 200*j*, eleventh lighting device 200*k*, and twelfth lighting device 200*l* to activate them. Also, the integrated control module processor 380 controls the first to ninth lighting devices 200*a* to 200*i* to deactivate them.

Figure 12:
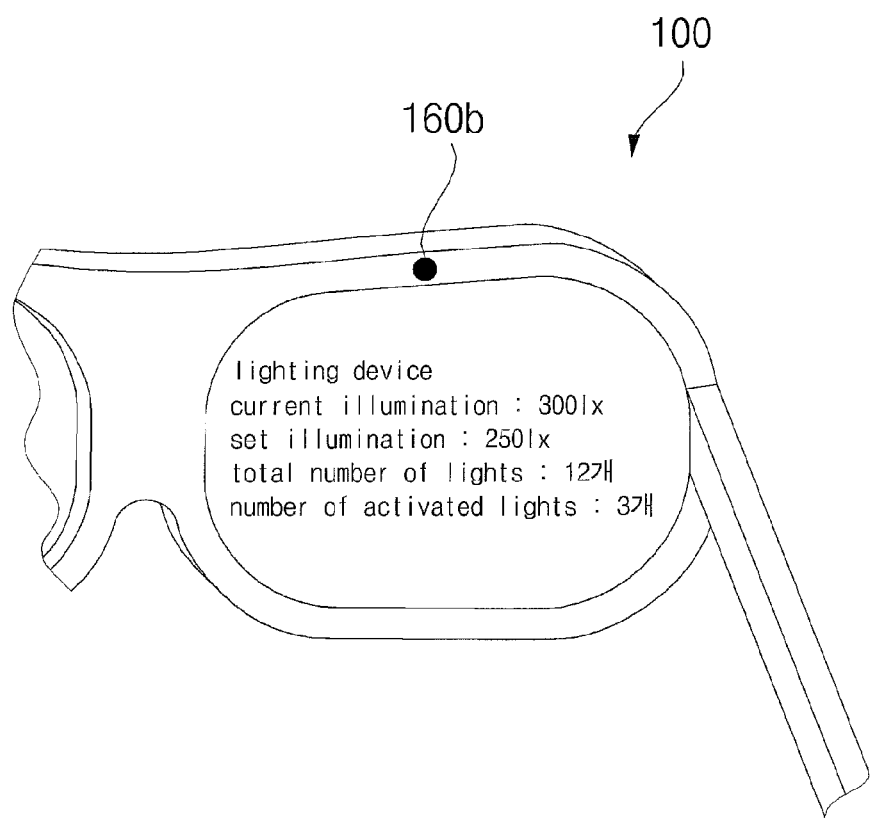
FIG. 12 is an illustration of a lighting control screen displayed on a wearable device according to an exemplary embodiment of the present invention.

FIG. 12 is an illustration of a lighting control screen displayed on a wearable device according to an exemplary embodiment of the present invention.

Referring to FIG. 12, the wearable device controller 180 establishes a communication connection with the lighting device 200 or the integrated control module 300. While connected to the lighting device 200 or the integrated control module 300 for communication, the wearable device controller 180 goes into the first mode or the second mode. In this case, the wearable device controller 180 may go into the first mode upon receiving user input through the wearable device input unit 120. While in the first mode or the second mode, the wearable device controller 180 displays a control screen related to the control of the lighting device 200. The current illumination, set illumination, total number of lights, and number of activated lights may be displayed on the control screen.

Figure 13:
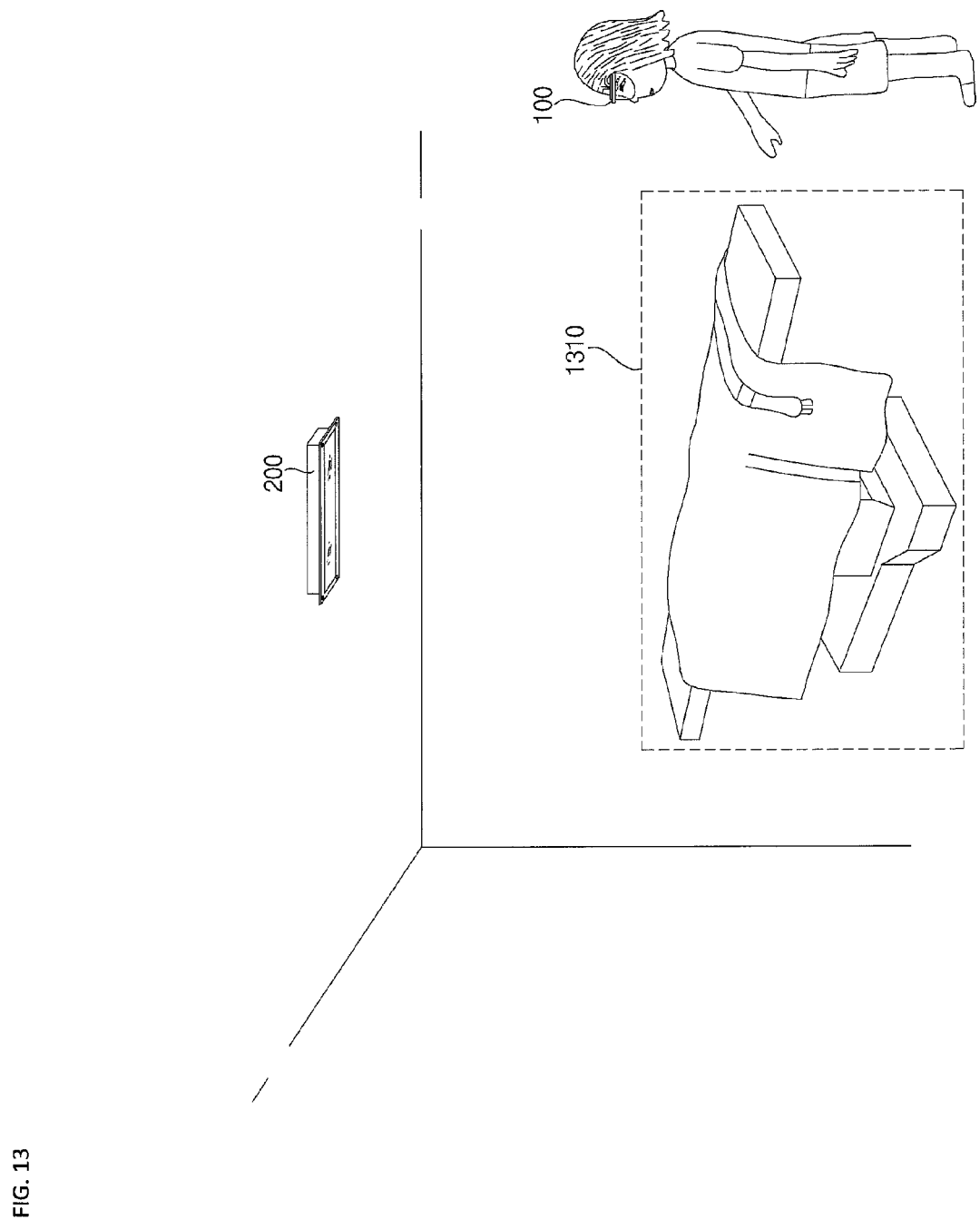
FIGS. 13 and 14 are views for explaining operation of the lighting system according to the first or second embodiment of the present invention.
Figure 14:
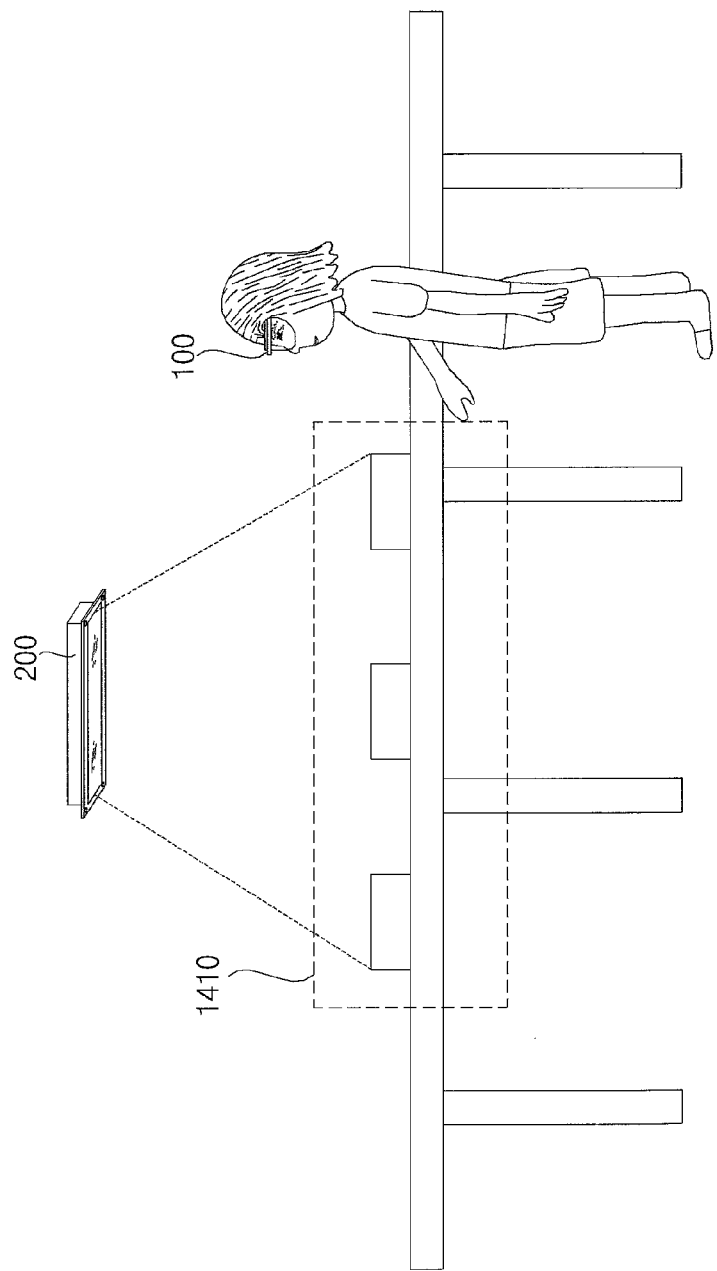

FIGS. 13 and 14 are views for explaining operation of the lighting system according to the first or second embodiment of the present invention.

A description will be given of the lighting system according to the first embodiment of the present invention with reference to FIGS. 13 and 14. The controller 280 is connected to the wearable device 100 for communication through the communication unit 210. The controller 280 enters the first mode while being connected to the wearable device 100 for communication. In the first mode, the controller 280 receives at least one image from the wearable device 100. Here, the image may be an image of a space in the user's line of sight.

When the user performs elaborate work with the wearable device 100 worn on their head, the wearable device 100 can acquire an image of the work through the camera 160.

For example, when the user performs an operation with the wearable device 100 put on their head in an operating room, as shown in FIG. 13, the wearable device 100 can acquire an image of the operation.

For example, when the user performs assembly work with the wearable device 100 worn on their head, as shown in FIG. 14, the wearable device 100 can acquire an image of the assembly work.

For example, when the user performs sewing work with the wearable device 100 worn on their head, the wearable device 100 can acquire an image of the sewing work through the camera 160 included therein.

The wearable device 100 transmits an image of an operation to the lighting device 200 and the lighting device 200 receives the image. The controller 280 detects video content from the image of the operation.

For example, the video content can be an image of a surgical site of a patient, surgical equipment or user's hand. For example, the video content can be an image of an object to be assembled, assembly equipment, assembled parts or a user's hand. For example, the video content can be an image of a sewed object, needle, thread or a user's hand.

The controller 280 confirms the video content by comparing the video content with objects pre-stored in the memory 240. The controller 280 calculates appropriate illumination or appropriate color of lighting on the basis of the confirmed video content. The controller 280 transmits a control signal on the basis of the calculated illumination or color to the driving unit 260 to control the intensity of illumination or color of light emitted from the light-emitting unit 270.

The memory 240 may pre-store illuminance values or colors respectively corresponding to elaborate tasks. The controller 280 may generate and output a control command according to an illuminance value or color corresponding to a detected operation to control the light-emitting unit 270.

While a case in which the image processor 281 is included in the lighting device 200 has been described in detail with reference to FIGS. 13 and 14, the image processor 181 may be included in the wearable device 100, as described above. In this case, object detection, object confirmation and operation for each application may be performed by the image processor 181 included in the wearable device 100.

When the user performs an elaborate task with the wearable device 100 worn on their head through the aforementioned operation, lighting can be controlled to suit the working conditions.

A description will be given of the lighting system according to the second embodiment of the present invention with reference to FIGS. 13 and 14. The integrated control unit processor 380 is connected to the wearable device 100 for communication through the integrated control unit communication unit 310. The integrated control unit processor 380 enters the second mode while being connected to the wearable device 100 for communication. In the second mode, the integrated control unit processor 380 receives at least one image from the wearable device 100. Here, the image may be an image of a space in the user's line of sight.

When the user performs an elaborate task with the wearable device 100 worn on their head, the wearable device 100 can acquire an image of the task through the camera 160 included therein.

The integrated control unit processor 380 may receive information on the location of an occupant from the lighting device 200. Upon reception of the at least one image from the wearable device 100 and reception of the information on the location of the occupant from the lighting device 200, the integrated control unit processor 380 detects video content from the image of the task.

The integrated control unit processor 380 confirms the video content by comparing the video content with objects stored in the memory 340. The integrated control unit processor 380 calculates appropriate illumination or appropriate color of lighting on the basis of the confirmed video content. The integrated control unit processor 380 controls the lighting device 200 on the basis of the video content and the location of the occupant according to the calculated illumination or color.

The memory 340 may store illuminance values or colors respectively corresponding to elaborate tasks. The integrated control unit processor 380 may generate and output a control command according to an illuminance value or color corresponding to a detected operation to control the lighting device 200.

The integrated control unit memory 340 may pre-store illuminance values or colors respectively corresponding to elaborate tasks. The integrated control unit processor 380 may generate and output a control command according to an illuminance value or color corresponding to a detected operation to control the lighting device 200.

Meanwhile, this invention can be implemented in processor-readable codes in a processor-readable recording medium provided on the SCA-based application system. Here, the processor-readable recording medium includes all kinds of recording devices for storing processor-readable data. Examples of the processor-readable recording medium include includes a computer-readable storage medium such as ROM, RAM, a CD-ROM, magnetic tapes, floppy disks, and optical data storage devices, and a means implemented in the form of carrier waves, for example, transmission via the Internet. The processor-readable recording medium may be distributed among computer systems connected to a network, and processor-readable codes may be stored and executed in a decentralized fashion.

Furthermore, although the exemplary embodiments of the present invention have been shown and described, the present invention is not limited to the above specific embodiments, and a person having ordinary skill in the art to which the invention belongs may modify the embodiments in various ways without deuniting from the gist of the present invention which is written in the claims. The modified embodiments should not be interpreted individually from the technical spirit or prospect of the present invention.

In order to overcome the above-described problems, an aspect of the present invention provides a lighting system and a control method thereof which allow for lighting control based on images acquired by a wearable device.

In one aspect, an exemplary embodiment of the present invention is directed to a lighting device including: a communication unit that communicates with a wearable device with at least one camera and receives at least one image captured by the camera; a light emitting unit including one or more light emitting elements; and a controller that detects a readable medium containing a plurality of characters or visual content containing at least one color from the image and controls the light emitting unit based on the readable medium or the visual content.

In another aspect, an exemplary embodiment of the present invention is directed to a lighting system including: a plurality of lighting devices each including one or more light emitting units and a person-in-room sensing unit for sensing the position of a person wearing a wearable device in a room; and an integrated control module that communicates with the wearable device with at least one camera, receives at least one image captured by the camera, detects a readable medium containing a plurality of characters or visual content containing at least one color from the image, and controls the plurality of lighting devices based on the readable medium or visual content or the position of the person in the room.

In still another aspect, an exemplary embodiment of the present invention is directed to a wearable device including: a camera that receives at least one image; a wireless communication unit that sends and receives data by communicating with at least one lighting device; and a wearable device controller that detects a readable medium containing a plurality of characters or visual content containing at least one color from the image, generates a control signal for controlling the lighting device based on the readable medium or visual content, and controls the wireless communication unit to transmit the control signal to the lighting device.

The effects of at least one exemplary embodiment of the present invention having the above-described configuration are as follows:

First, a lighting system according to an exemplary embodiment of the present invention can control lighting based on images acquired by a camera in a wearable device. Accordingly, the present invention has an active lighting control effect.

Second, the right level of illumination suitable for reading a readable medium can be provided.

Third, the right level and color of illumination suitable for watching visual content can be provided.

Fourth, the lighting system according to the exemplary embodiment of the present invention actively controls lighting according to acquired images. Accordingly, the present invention can increase user convenience.

The effects of the present invention are not limited to the above-mentioned effects, and other effects not mentioned above can be clearly understood from the definitions in the claims by one skilled in the art.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting system comprising:
   a plurality of lighting devices each including one or more light emitting units and a sensing unit for sensing a position of an object in a room; and
   an integrated control module that communicates with a wearable device having at least one camera, receives at least one image captured by the camera, detects a readable medium containing a plurality of characters or visual content containing at least one color from the image, and controls the plurality of lighting devices based on the readable medium or the visual content and based on the position of the object in the room.

2. The lighting system of claim 1, wherein when the sensing unit receives a sensing signal, the integrated control module activates any lighting device that includes the sensing unit that has received the sensing signal and deactivates any lighting device that includes the sensing unit that has not received the sensing signal.

3. The lighting system of claim 1, wherein the integrated control module controls a total number of the plurality of lighting devices to be activated among the plurality of lighting devices according to a size of the characters written on the readable medium.

4. The lighting system of claim 1, wherein the integrated control module controls a total number of the plurality of lighting devices to be activated among the plurality of lighting devices according to a total number of the characters contained in the readable medium.

5. The lighting system of claim 4, wherein when the total number of the characters is greater than or equal to a first reference value, the integrated control module increases the total number of the plurality of lighting devices to be activated among the plurality of lighting devices.

6. The lighting system of claim 4, wherein when the total number of the characters is less than or equal to a second reference value, the integrated control module decreases the total number of the plurality of lighting devices to be activated among the plurality of lighting devices.

7. The lighting system of claim 1, wherein the integrated control module includes an image processor that detects the readable medium or the visual content from the image and calculates a level or a color of illumination corresponding to the readable medium or the visual content.

8. The lighting system of claim 7, wherein the integrated control module includes an integrated control module communication unit that communicates with the wearable device and the lighting device, and
   the image processor includes:
   an object detector that detects the readable medium or the visual content from the image; and
   an application unit that calculates the level or the color of illumination corresponding to the readable medium or the visual content.

* * * * *